(12) United States Patent
Abdollahi et al.

(10) Patent No.: US 9,292,084 B2
(45) Date of Patent: Mar. 22, 2016

(54) CONTROL SYSTEMS AND METHODS FOR HEAD-MOUNTED INFORMATION SYSTEMS

(75) Inventors: Hamid Abdollahi, Vancouver (CA); Dan Eisenhardt, Vancouver (CA); Li Chen, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 13/501,735

(22) PCT Filed: Oct. 13, 2010

(86) PCT No.: PCT/CA2010/001592
§ 371 (c)(1),
(2), (4) Date: Jun. 4, 2012

(87) PCT Pub. No.: WO2011/044680
PCT Pub. Date: Apr. 21, 2011

(65) Prior Publication Data
US 2012/0235902 A1    Sep. 20, 2012

Related U.S. Application Data

(60) Provisional application No. 61/251,261, filed on Oct. 13, 2009, provisional application No. 61/251,998, filed on Oct. 15, 2009, provisional application No. 61/259,466, filed on Nov. 9, 2009.

(51) Int. Cl.
*G09G 5/00* (2006.01)
*G06F 3/01* (2006.01)
(Continued)

(52) U.S. Cl.
CPC .............. *G06F 3/012* (2013.01); *A42B 3/042* (2013.01); *G02B 27/017* (2013.01); *G06F 3/017* (2013.01); *A63B 2071/0666* (2013.01); *G02B 2027/014* (2013.01); *G02B 2027/0187* (2013.01)

(58) Field of Classification Search
CPC ......... A42B 3/042; G06F 3/012; G06F 3/017; G02B 27/017; G02B 2027/014; G02B 2027/0187; A63B 2071/0666
USPC .............................................. 345/8, 156–184
See application file for complete search history.

(56) References Cited

U.S. PATENT DOCUMENTS 6,184,847 B1    2/2001 Fateh et al.
6,396,497 B1    5/2002 Reichlen
(Continued)

FOREIGN PATENT DOCUMENTS

WO    WO 2004/021699 A1    3/2004

OTHER PUBLICATIONS

International Search Report for PCT/CA2010/001592 dated Mar. 2, 2011.
(Continued)

*Primary Examiner* — Amare Mengistu
*Assistant Examiner* — Jennifer Zubajlo
(74) *Attorney, Agent, or Firm* — Patent Capital Group

(57) ABSTRACT

A head-mounted information system is provided, the head-mounted information system comprising a frame configured to be mounted on a head of a user, a display unit coupled to the frame, a sensor unit coupled to the frame comprising one or more motion sensors, and, a processor unit coupled to the frame and connected to receive signals from the motion sensors. The processor unit comprises a processor and a memory accessible by the processor. The processor unit is configured to monitor the received signals and enter a gesture control mode upon detection of a gesture control enable signal. In the gesture control mode the processor is configured to convert signals received from the motion sensors into menu navigation commands.

37 Claims, 13 Drawing Sheets

(51) Int. Cl.
  *A42B 3/04* (2006.01)
  *G02B 27/01* (2006.01)
  *A63B 71/06* (2006.01)

(56) References Cited

U.S. PATENT DOCUMENTS

| | | | |
|---|---|---|---|
| 7,365,736 | B2 | 4/2008 | Marvit et al. |
| 7,580,540 | B2 | 8/2009 | Zurek et al. |
| 2002/0021407 | A1 | 2/2002 | Elliott |
| 2005/0156817 | A1 | 7/2005 | Iba |
| 2008/0208396 | A1 | 8/2008 | Cairola et al. |
| 2009/0303204 | A1* | 12/2009 | Nasiri .................. A63F 13/06 345/184 |
| 2010/0079356 | A1* | 4/2010 | Hoellwarth .......... G02B 27/017 345/8 |
| 2012/0064951 | A1 | 3/2012 | Agevik et al. |

OTHER PUBLICATIONS

Written Opinion of the International Searching Authority for PCT/CA2010/001592 dated Mar. 2, 2011.
International Preliminary Report on Patentability for PCT/CA2010/001592 dated Feb. 29, 2012.
Niklas Hjortsmarker, "Experimental system for validating GPS/INS integration algorithms", 2005:307 CIV—ISSN 1402-1617, pp. 1-92.
Mohinder S. Grewal et al., "Global Positioning Systems Inertial Navigation and Integration", 2d ed, ISBN-13 978-0-470-04190-1.

* cited by examiner

CONTROL SYSTEMS AND METHODS FOR HEAD-MOUNTED INFORMATION SYSTEMS

CROSS-REFERENCE TO RELATED APPLICATIONS

This application claims Paris Convention priority from U.S. Patent Applications No. 61/251,261 filed 13 Oct. 2009, No. 61/251,998 filed 15 Oct. 2009 and No. 61/259,466 filed 9 Nov. 2009. For the purposes of the United States of America, this application claims the benefit under 35 U.S.C. §119 of U.S. Patent Applications No. 61/251,261 filed 13 Oct. 2009, No. 61/251,998 filed 15 Oct. 2009 and No. 61/259,466 filed 9 Nov. 2009, each of which is hereby incorporated by reference.

TECHNICAL FIELD

This invention relates generally to head-mounted information systems which provide information to their users. Particular embodiments provide systems and methods for controlling such head-mounted systems.

BACKGROUND

Various prior art systems exist for providing skiers, snowboarders and athletes taking part in other sports with information regarding their performance. Many current solutions such as handheld GPS devices, performance measurement units, wristwatches, and mobile phones require the user to stop, and possibly remove gloves, in order to extract the device and look at the information. This can create discomfort, waste time, cause delays and may furthermore be prone to inaccurate measurements. Even if the user is not required to stop, such systems can be difficult to see and/or to interact with while the user is performing their desired activity (e.g. skiing or snowboarding).

Many existing electronic performance measurement devices for skiers, snowboarders and other athletes use GPS techniques and require bulky sensor modules mounted at various parts of the user's body. Most of the existing GPS-based devices for skiing and snowboarding have the following limitations: the GPS data is prone to atmospheric delay errors; and while the GPS-based position errors are generally bounded, the GPS signal can be lost when the corresponding satellites are geometrically inaccessible. Most of the available equipment includes one or more sensors attached to the limbs of the skier that use wireless communication to the main unit. This makes it inconvenient to use and prone to data errors due to interference and signal attenuation. Furthermore, the output displays of current technologies are often inconvenient to access and lack user-friendly interfaces, and users may need to remove their gloves or mittens in order to control the devices.

It can be difficult and/or inconvenient for users to control performance monitoring devices, particularly when the user is wearing gloves or mittens. Also, for a device which is located in a pocket, backpack or under the clothing of the user, interaction with the device while engaging in athletic or other activity may not be practical. Furthermore, for activities which require both of the user's hands (e.g. skiing, cycling (including motorcycling), piloting all-terrain vehicles, and snowmobiling), interaction with a performance monitoring or other electronic device which requires the user to press buttons or manipulate other controls may be unsafe or impossible.

Patents and published applications relating to controlling electronic systems with head-mounted devices include the following:
U.S. Pat. No. 6,184,847 to Fateh et al;
U.S. Pat. No. 6,396,497 to Riechlen;
U.S. Pat. No. 7,580,540 to Zurek et al.;
United States Patent Application Publication No. 2002/0021407 to Elliott;
United States Patent Application Publication No. 2005/0156817 to Iba; and,
United States Patent Application Publication No. 2008/0208396 to Cairola et al.

The inventors have determined a need for improved systems and methods for interacting with or otherwise controlling head-mounted information systems.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments of the invention provide systems and methods for interacting with head-mounted information systems having sensing and display systems as well as wireless connectivity to 3rd party devices. Such head-mounted information systems may be implemented in a variety of head-mounted devices, such as, by way of non-limiting example: eyewear or eye protection devices (e.g. goggles, glasses, sunglasses, masks and/or the like), helmets (e.g. ski helmets, cycling (including motorcycling) helmets and/or the like) and/or hands-free mobile communication devices (e.g. hands free devices for mobile phones, PDAs, portable music players and/or the like). The head-mounted information system may provide the user with a heads-up display for displaying various parameters in real-time (such as, by way of non-limiting example: position, time, speed, vertical drop, airtime, etc.). The electronic components of the head-mounted information systems according to some embodiments include a sensor unit, a processor unit, a power unit, and a display unit.

Figure 1:
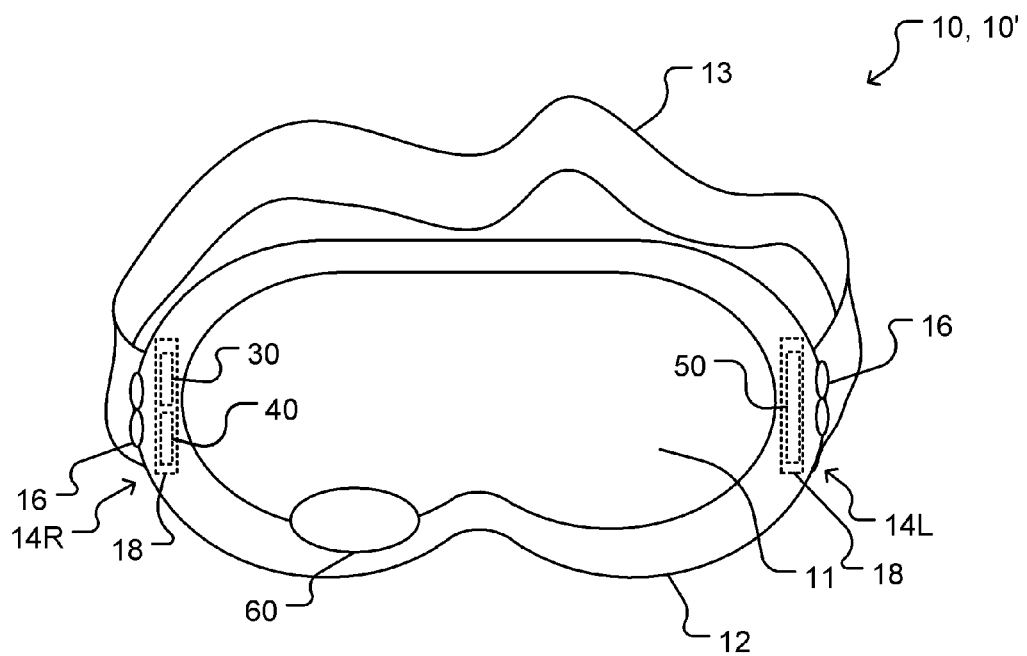
FIG. 1 shows a pair of goggles incorporating a head-mounted information system according to an example embodiment of the invention.

FIG. 1 shows a pair of goggles 10 incorporating a head-mounted information system 10' according to a particular example embodiment of the invention. Goggles 10 may have the features of traditional goggles for a skier, snowboarder or cyclist, for example. Goggles 10 include processing circuitry configured to implement systems and methods according to example embodiments of the invention, as discussed below. Goggles 10 comprise a frame 12 which has an opening for receiving a lens assembly 11. Lens assembly 11 may comprise, for example, a cylindrical dual lens with a silicone seal, with an airtight space between the lenses to reduce fogging. The lenses may both have a 6-inch (15.25 cm) radial base curvature. The lenses may be coated with an anti-fog sealant. The lenses of the illustrated embodiment do not include ventilation holes, but may be ventilated in some embodiments. The lenses may be formed to define a recess in order to fit around a display unit 60 (discussed further below). Display unit 60 may be coupled to frame 12 so as to be positioned below a user's right eye when goggles 10 are worn, or at any other convenient location, as discussed further below.

Frame 12 may include a standard ventilation system (not shown) as known in the art. Suitable foam having a thickness of approximately 0.5 inches (1.25 cm) may be attached to the inner rim of frame 12 (i.e., the side which faces the user's face). Thinner foam membranes (several mm thick) may cover all vents on frame 12. Frame 12 may be held in place by a strap 13. Strap 13 may comprise a standard adjustable elastic head strap that can be worn over a helmet (or over a hat, or directly on a user's head) without sliding down or up.

Figure 1A:
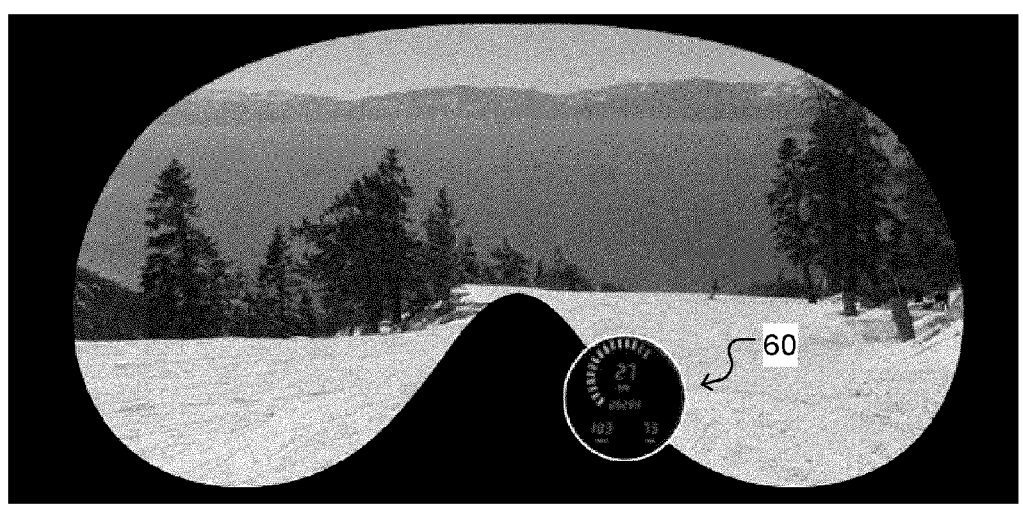
FIG. 1A shows an example view from the goggles of FIG. 1.

Frame 12 has enlarged portions referred to herein as "outriggers" 14 on the left and right sides thereof (individually numbered 14L and 14R, respectively). Outriggers 14 house portions of an electronic system 20 for head-mounted information system 10', as described below with reference to FIG. 2. In the illustrated embodiment, electronic system 20 comprises a sensor unit 30 and a processor unit 40 housed within right outrigger 14R, and a power unit 50 housed within left outrigger. Electronic system 20 also comprises a display unit 60 positioned on frame 12 just below the right eye of a user wearing goggles 10 for providing information to the user. FIG. 1A shows an example view looking out goggles 10 which illustrates an example position of display unit 60. The locations of the components of electronic system 20 may be different in different embodiments. Display unit 60 may be positioned to provide for convenient viewing of display unit 60 without overly interfering with the user's sight lines through the remainder of lens assembly 11. In some embodiments, display unit 60 may be positioned at or near an edge of the user's field of vision. For example, display unit 60 could be positioned below the user's left eye in some embodiments, or may be positioned above or to the side of either eye.

Similarly, sensors unit 30, processor unit 40 and power unit 50 may be positioned at any convenient locations within frame 12.

One or more user interface keys 16 may be provided on the sides of frame 12 in some embodiments (two user interface keys 16 are shown on each side of frame 12 in the illustrated embodiment, but a different number of user interface keys could be provided). User interface keys 16 are configured such that they are easily reached by a user and may be tapped or otherwise manipulated while wearing gloves to interact with electronic system 20 of head-mounted information system 10', as described below. In other embodiments, other forms of user-interface components could be provided in addition to or in the alternative to user interface keys 16. Non-limiting examples of such user interface components include: slidable or rotatable user interface components, joystick-type user interface components, optical (e.g. laser or LED-based) user interface components or the like.

In some embodiments, outriggers 14 may comprise flat plastic housings 18 embedded within frame 12 on either side of goggles 10 which house components of electronic system 20. Housings 18 protect components of electrical system 20 from mechanical stresses. Housings 18 may also be watertight in some embodiments to protect components of electrical system 20 from moisture.

In other respects, goggles 10 may have the features of traditional goggles for a skier, snowboarder or cyclist, for example.

Figure 1B:
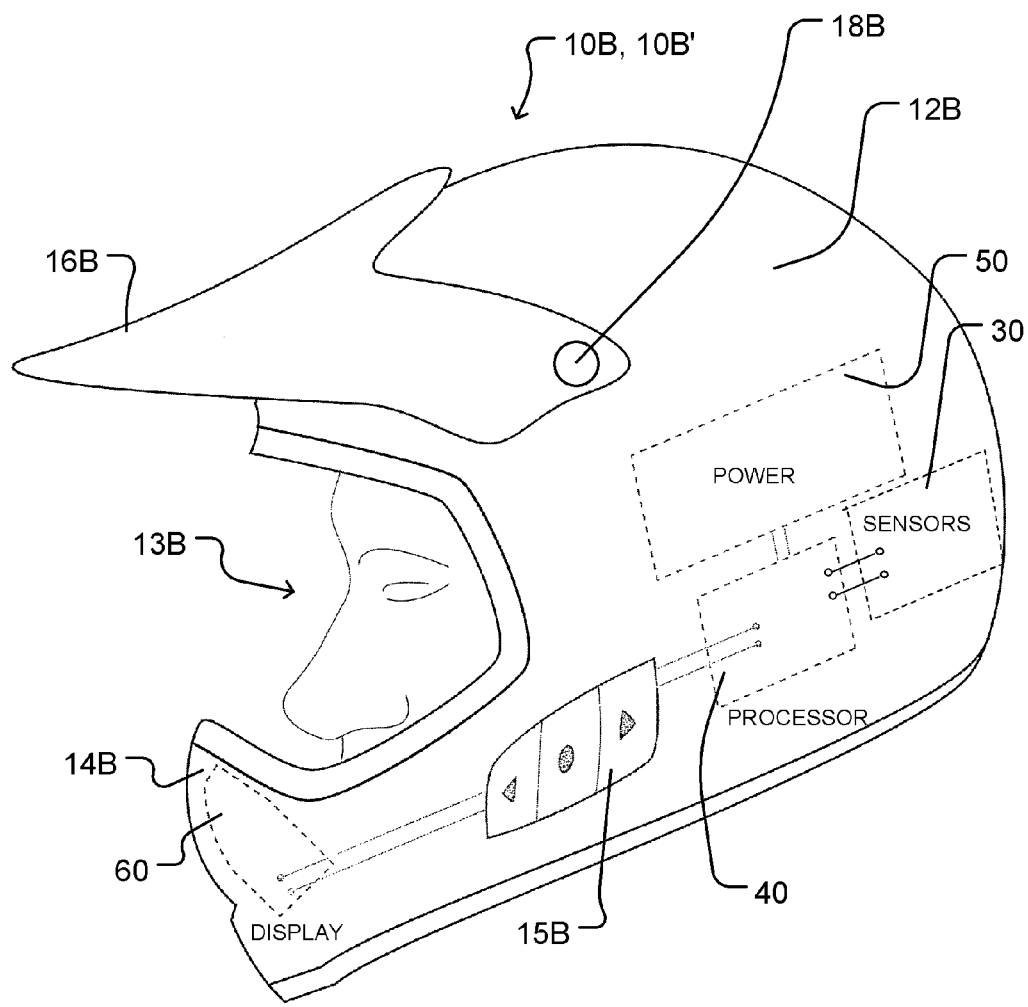
FIG. 1B shows a helmet incorporating a head-mounted information system according to another example embodiment of the invention.

FIG. 1B shows a helmet 10B (e.g. a motorcycle helmet) incorporating a head-mounted information system 10B' according to a particular example embodiment of the invention. Helmet 10B may have the features of traditional helmets for its particular application. For example, where helmet 10B is a motorcycle helmet, it may have the features of traditional motorcycle helmets or where helmet 10B is a skiing helmet, it may have the features of traditional skiing helmets. Helmet 10B includes processing circuitry configured to implement systems and methods according to example embodiments of the invention, as discussed below.

Helmet 10B of the illustrated embodiment, comprises an exterior shell 12B and one or more interior deformable layers (not explicitly enumerated) which define a cavity for accommodating the head of a user. Exterior shell 12B and/or the interior deformable layer(s) may function in manner similar to frame 12 of goggles 10 described herein and may be referred to in some instances as a frame 12B of helmet 10B. In particular embodiments, exterior shell 12B is relatively hard compared to the interior deformable layer(s). In some embodiments, exterior shell 12B and/or the interior deformable layer(s) 10 may themselves comprise multiple layers. In the illustrated embodiment, helmet 10B comprises an optional face-protection element 14B which may be integrally formed with the remainder of helmet 10B or which may be detachably mounted to the remainder of helmet 10B. In the illustrated embodiment, helmet 10B comprises optional eye-protection element (e.g. screen) 16B which may be rotated about pivot joints 18B into an open configuration (shown in FIG. 1B) where eye-protection element is away from face aperture 13B and the user's eyes and into a closed configuration (not shown) where eye-protection element is in front of face aperture 13B and the user's eyes. Eye-protection element 16B may be relatively transparent or may filter light in some respects (e.g. a color filter, a darkening filter, a polarizing filter or the like).

Helmet 10B houses the various components of an electronic system 20 for head-mounted information system 10B', as described below with reference to FIG. 2. In the illustrated embodiment, electronic system 20 comprises a sensor unit 30, a processor unit 40 and a power unit 50 which may be housed between exterior shell 12B and the interior deformable layer(s). In other embodiments, some or all of these components could be mounted on an exterior of exterior shell 12B and could be protected, if desired, by suitably formed enclosures or the like. In still other embodiments, some or all of these components could be otherwise connected to frame 12B of helmet 10B. The locations of the components of electronic system 20 (e.g. sensors 30, processor unit 40, and power unit 50) may be different in different embodiments. In some embodiments, the grouping of the components of electronic system into the schematic components (e.g. sensors 30, processor unit 40, and power unit 50) is not necessary and the locations of these schematic components may be distributed over a plurality of locations in helmet 10B. For example, some components could be on the right side of helmet 10B and others could be on the left side of helmet 10B to maintain balance of helmet 10B.

Electronic system 20 also comprises a display unit 60. In the illustrated embodiment, display unit 60 is located on an interior of face-protection element 14B, where it can be see by the user when their head is inside helmet 10B, but which allows the user to have a full view out face-aperture 13B. In other embodiments, display unit 60 may be located in other portions of face-protection element 14B. For example, display unit 60 may extend upward from a top of face-protection element 14B and into face aperture 13B to permit the user to more easily see display unit 60. Face-protection element 14B may be modified to house display unit 60 in a manner which facilitates viewing of display unit 60 by the user when helmet 10B is being worn.

In other embodiments, display unit 60 may be located in eye-protection element 16B. In such embodiments, the particular location of display unit 60 in eye-protection element 16B may be selected to allow user to easily see display unit 60 while minimizing the interference of the user's vision through face aperture 13B. In particular, the locations of display unit 60 may be similar to any of the locations described above for display unit 60 within goggles 10. In other embodiments, helmet 10B may be used in conjunction with goggles, in which case helmet 10B may house some of the components of electronic system 20 (e.g. sensors 30, processor unit 40, and power unit 50) and display unit 60 may be located in the goggles in a manner similar to display unit 60 of goggles 10 described above. In still other embodiments, helmet 10B may be used in conjunction with goggles and the components of electronic system 20 (e.g. sensors 30, processor unit 40, and power unit 50) and display unit 60 may be distributed over suitable locations in helmet 10B and/or goggles 10.

In the illustrated embodiment, head-mounted information system 10B' of helmet 10B comprises a plurality of user-interface components 15B (e.g. buttons or other components). A user may interface with head-mounted information system 10B' using user-interface components 15B in a manner similar to the user interaction with user-interface keys 16 on goggles 10 described herein.

In other respects, helmet 10B may have the features of a traditional helmet (e.g. for a cyclist, skier or motorcyclist).

Figure 1C:
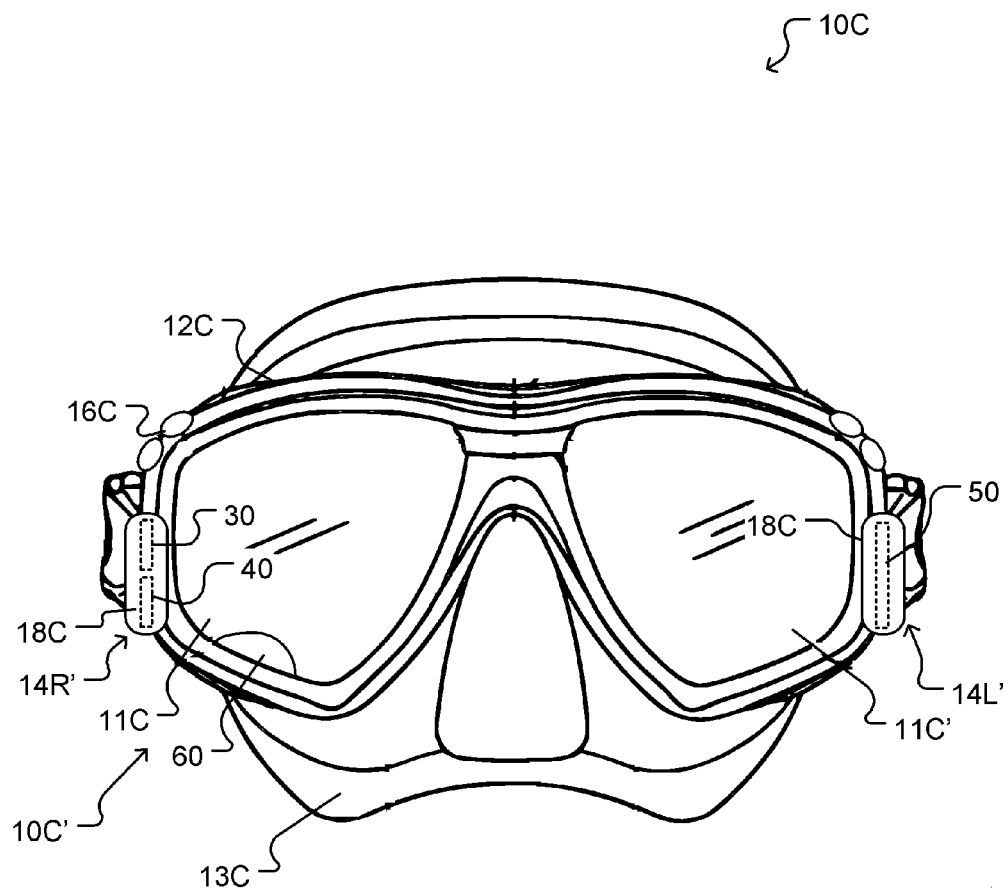
FIG. 1C shows an underwater mask incorporating a head-mounted information system according to an example embodiment of the invention.

FIG. 1C shows an underwater mask 10C incorporating a head-mounted information system 10C' according to a particular example embodiment of the invention. Mask 10C may have the features of traditional underwater mask for a SCUBA diver or snorkeler, for example. Mask 10C includes processing circuitry configured to implement systems and methods according to example embodiments of the invention, as discussed below. In the illustrated embodiment, mask 10C comprises a frame 12C which has openings for receiving lens assemblies 11C and 11C'. In other embodiments, mask 10C could comprise a single lens assembly. Lens assemblies 11C and 11C' may be coated with an anti-fog sealant. Either or both of the lens assemblies 11C and 11C' may be formed to define a recess in order to fit around a display unit 60 (discussed further below). Display unit 60 may be coupled to frame 12C so as to be positioned below a user's right eye when mask 10C is worn, or at any other convenient location, as discussed further below.

Frame 12C and/or lenses 11C and 11C' may include a standard ventilation system (not shown) as known in the art. A suitable elastic membrane (e.g., made of rubber or the like) 13C is attached to the inner rim of frame 12C (i.e., the side which faces the user's face). Frame 12C may be held in place by a strap (not shown), which may comprise a standard adjustable elastic head strap that can be worn directly on a user's head (or over a helmet) without sliding down or up.

Frame 12C has enlarged portions referred to herein as "outriggers" 14' on the left and right sides thereof (individually numbered 14L' and 14R', respectively). Outriggers 14' house portions of an electronic system 20 for head-mounted information system 10C', as described below with reference to FIG. 2. In the illustrated embodiment, electronic system 20 comprises a sensor unit 30 and a processor unit 40 housed within right outrigger 14R', and a power unit 50 housed within left outrigger 14L'. Electronic system 20 also comprises a display unit 60 positioned on frame 12C just below the right eye of a user wearing mask 10C for providing information to the user. The locations of the components of electronic system 20 may be different in different embodiments. Display unit 60 may be positioned to provide for convenient viewing of display unit 60 without overly interfering with the user's sight lines through the remainder of lens assembly 11C. For example, display unit 60 could be positioned below the user's left eye in some embodiments, or may be positioned above or to the side of either eye. Similarly, sensors unit 30, processor unit 40 and power unit 50 may be positioned at any convenient locations within frame 12C.

One or more user interface keys 16C may be provided on the sides of frame 12C in some embodiments (two user interface keys 16C are shown on each side of frame 12C in the illustrated embodiment, but a different number of user interface keys could be provided). User interface keys 16C are configured such that they are easily reached by a user and may be tapped or otherwise manipulated while wearing gloves to interact with electronic system 20 of head-mounted information system 10C', as described below. In other embodiments, other forms of user-interface components could be provided in addition to or in the alternative to user interface keys 16C. Non-limiting examples of such user interface components include: slidable or rotatable user interface components, joystick-type user interface components, optical (e.g. laser or LED-based) user interface components or the like.

In some embodiments, outriggers 14' may comprise flat plastic housings 18C embedded within frame 12C on either side of mask 10C which house components of electronic system 20. Housings 18C protect components of electrical system 20 from mechanical stresses. Housings 18C are also water-tight to protect components of electrical system 20 when underwater.

Figure 1D:
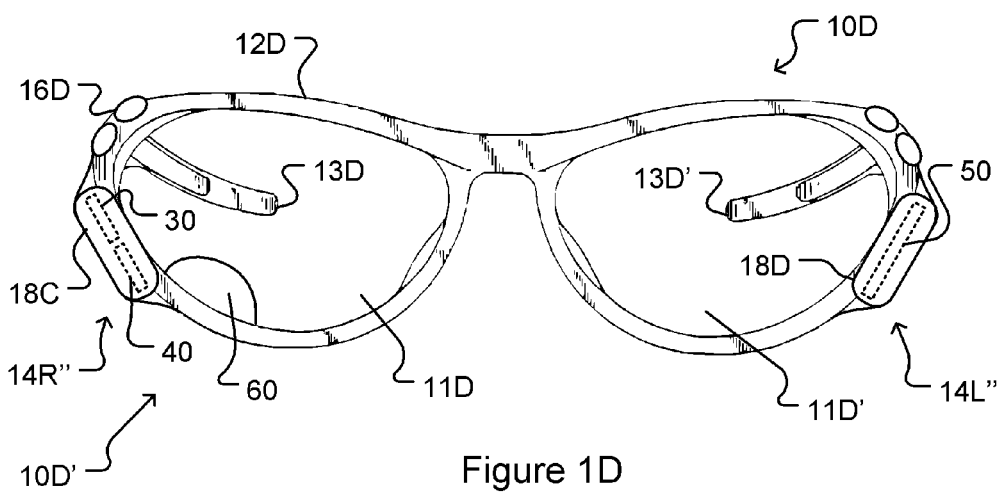
FIG. 1D shows a pair of sunglasses incorporating a head-mounted information system according to an example embodiment of the invention.

FIG. 1D shows a pair of sunglasses 10D incorporating a head-mounted information system 10D' according to a particular example embodiment of the invention. Sunglasses 10D may have the features of traditional sunglasses useful for driving, sporting activities or leisure, for example. As one skilled in the art will appreciate, head-mounted information system 10D' could also be incorporated into types of glasses other than sunglasses, such as, for example, prescription glasses, untinted glasses, safety glasses, etc. Sunglasses 10D include processing circuitry configured to implement systems and methods according to example embodiments of the invention, as discussed below. Sunglasses 10D comprise a frame 12D which has openings for receiving lens assemblies 11D and 11D'. Lens assemblies 11D and 11D' may be formed to define a recess in order to fit around a display unit 60 (discussed further below). Display unit 60 may be coupled to frame 12D so as to be positioned below a user's right eye when sunglasses 10D are worn, or at any other convenient location, as discussed further below.

Frame 12D may be held in place by arms 13D and 13D', and, optionally, a strap or other additional securing means (not shown).

Frame 12D has enlarged portions referred to herein as "outriggers" 14" on the left and right sides thereof (individually numbered 14L" and 14R", respectively). In some embodiments, outriggers are located on arm 13 and/or arm 13D'. Outriggers 14" house portions of an electronic system 20 for head-mounted information system 10D', as described below with reference to FIG. 2. In the illustrated embodiment, electronic system 20 comprises a sensor unit 30 and a processor unit 40 housed within right outrigger 14R", and a power unit 50 housed within left outrigger 14L". Electronic system 20 also comprises a display unit 60 positioned on frame 12D just below the right eye of a user wearing sunglasses 10D for providing information to the user. The locations of the components of electronic system 20 may be different in different embodiments. Display unit 60 may be positioned to provide for convenient viewing of display unit 60 without overly interfering with the user's sight lines through the remainder of lens assembly 11D. For example, display unit 60 could be positioned below the user's left eye in some embodiments, or may be positioned above or to the side of either eye. Similarly, sensors unit 30, processor unit 40 and power unit 50 may be positioned at any convenient locations within frame 12D and/or arm 13D and/or arm 13D'.

One or more user interface keys 16D may be provided on the sides of frame 12D and/or arm 13D and/or arm 13D' in some embodiments (two user interface keys 16D are shown on each side of frame 12D in the illustrated embodiment, but a different number of user interface keys could be provided). User interface keys 16D are configured such that they are easily reached by a user and may be tapped or otherwise manipulated while wearing gloves to interact with electronic system 20 of head-mounted information system 10D', as described below. In other embodiments, other forms of user-interface components could be provided in addition to or in the alternative to user interface keys 16D. Non-limiting examples of such user interface components include: slidable or rotatable user interface components, joystick-type user interface components, optical (e.g. laser or LED-based) user interface components or the like.

In some embodiments, outriggers 14" may comprise flat plastic housings 18D embedded within frame 12D on either side of sunglasses 10D which house components of electronic system 20. Housings 18D protect components of electrical system 20 from mechanical stresses. Housings 18D may also be water-tight in some embodiments to protect components of electrical system 20 from moisture.

In other respects, sunglasses 10D may have the features of traditional sunglasses useful for driving, sporting activities or leisure, for example.

Figure 2:
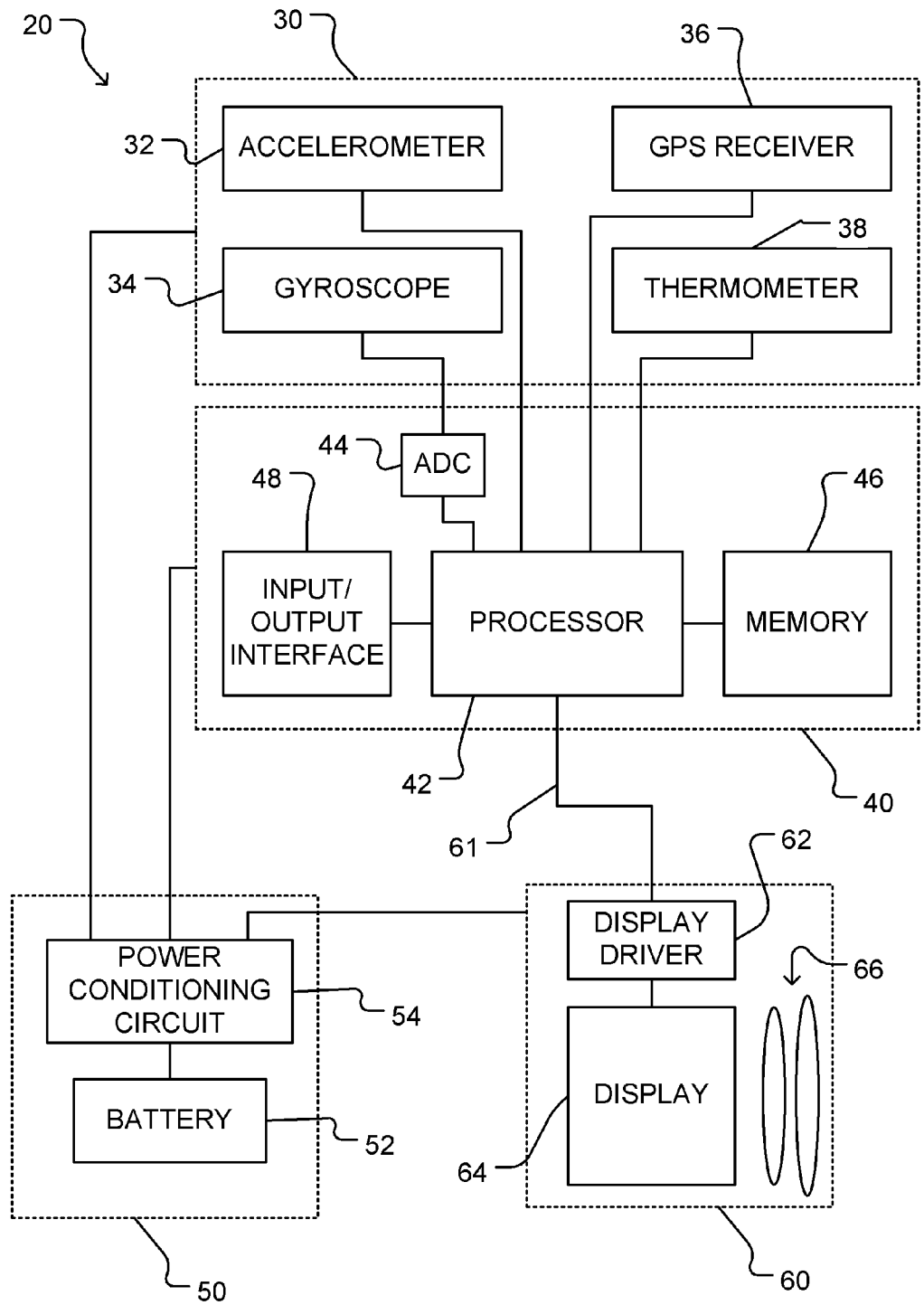
FIG. 2 schematically illustrates an electronic system suitable for use with the head-mounted information system of the example embodiments of FIGS. 1 to 1D

FIG. 2 shows an example electronic system 20 suitable for use with head-mounted information system 10' of goggles 10, head-mounted information system 10B' of helmet 10B, head-mounted information system 10C' of mask 10C and/or head-mounted information system 10D' of sunglasses 10D according to one example embodiment of the invention. As discussed above, electronic system 20 comprises sensor unit 30, processor unit 40, power unit 50 and display unit 60. It will be appreciated that goggles 10, helmet 10B and mask 10C represent non-limiting examples of devices that may incorporate head-mounted display systems incorporating electronic system 20. In other embodiments, head-mounted information systems may be provided in a variety of head-mounted devices, such as, by way of non-limiting example: other types of eyewear or eye protection devices (e.g. sunglasses, protective glasses or the like), other types of helmets (e.g. ski helmets, snowmobiling helmets or the like), other types of masks and/or hands-free mobile communication devices (e.g. hands free devices for mobile phones, PDAs, portable music players or the like).

Wiring connecting units 30, 40, 50 and 60 may be enclosed within channels formed in frame 12,12C or 12D (in the case of goggles 10, mask 10C or sunglasses 10D) or between exterior shell 12B and the deformable interior layer (in the case of helmet 10B), or may be enclosed within a separate casing (not shown). In embodiments of goggle 10, mask 10C or sunglasses 10D where sensor unit 30 and processor unit 40 are located in right outrigger 14R/14R'/14R", power unit 50 is located in left outrigger 14L/14L'/14L", and display unit is located below the user's right eye, power wiring connecting sensor, processor and display units 30, 40 and 60 to power unit 50 may be routed across the upper portion or "bridge" of frame 12/12C/12D, with the power wiring for display unit 60 continuing on around the lower right rim of frame 12/12C/12D. Similarly wiring connecting processor unit 40 to display unit 60 for providing image signals to display unit 60 may be routed around the lower right rim of frame 12/12C/12D. In embodiments of helmet 10B where face-protection element 14B is detachable, the wiring to display unit 60 may comprise detachable wiring connections (e.g. plugs). In embodiments of helmet 10B where display unit 60 is located in eye-protection element 16B, the wiring to display unit 60 may be routed through one or both pivot joints 18B.

In the illustrated embodiment, sensor unit 30 comprises a 3-axis accelerometer 32, a 3-axis gyroscope 34, a GPS receiver 36, and a thermometer 38. Accelerometer 32 and gyroscope 34 are collectively referred to herein as "IMU" (inertial monitoring unit) sensors. The IMU sensors 32, 34 and GPS receiver 36 have complementary strengths and weaknesses such that their combined use provides for improved reliability and accuracy of measurement of position and altitude as compared to each sensor on its own. Examples of such complementary strengths and weaknesses are described, for example, in "Experimental system for validating GPS/INS integration algorithms", Niklas Hjortsmarker, ISSN 1402-1617, and "Global Positioning Systems Inertial Navigation And Integration", 2nd edition, Mohinder S. Grewal et all, ISBN-13 978-0-470-04190-1, which are hereby incorporated by reference herein.

Accelerometer 32 may comprise, for example, a micro-electro-mechanical system (MEMS) device which produces digital output signals representative of linear accelerations along three perpendicular axes. In some embodiments, accelerometer 32 may comprise a LIS331DL motion sensor manufactured by STMicroelectronics.

Gyroscope 34 may comprise, for example, two MEMS devices, one of which produces analog output signals representative of angular velocities about two perpendicular axes, and one of which produces an analog output signal about a third axis perpendicular to the other two axes. In some embodiments, gyroscope 34 may comprise an IDG-500 for measuring angular velocities about an X-axis and a Y-axis, and an ISZ-500 for measuring angular velocity about a Z-axis, both of which are manufactured by InvenSense, Inc.

GPS receiver 36 may comprise, for example a Wide Area Augmentation System (WAAS) enabled GPS receiver with a built-in system clock. GPS receiver 36 may, for example, output digital signals using a protocol such as NMEA 0183 or NMEA 2000. Thermometer 38 may comprise, for example, a digital thermometer.

Processor unit 40 comprises a processor 42 which is connected to receive signals from accelerometer 32, gyroscope 34, GPS receiver 36 and thermometer 38 of sensor unit 30. Processor unit 40 may comprise an analog-to-digital converter (ADC) 44 connected between processor 42 and any of the sensors of sensor unit 30 which produce analog signals. In the illustrated embodiment, all sensors of sensor unit 30 except gyroscope 34 have digital outputs, so ADC 44 is connected only between gyroscope 34 and processor 42.

In the illustrated embodiment, processor unit 40 also comprises a memory 46 and an input/output interface 48. Memory 46 has stored therein various computer readable instructions for use by processor 42. In other embodiments, memory 46 may be integrated into processor 42. Input/output interface 48 is configured to support various communications protocols such as, for example, Bluetooth and/or USB, to allow processor 42 to communicate with other devices such as mobile phones and personal computers. Input/output interface 48 may also be configured to receive signals produced when a user interfaces with user interface keys 16 to allow the user to interact with processor 42. In other embodiments, input/output interface 48 may be integrated into processor 42.

Processor 42 is configured to transform signals received from sensor unit 30 to produce outputs representing various parameters relating to user performance, and other outputs, as discussed below. For example, processor 42 may produce outputs relating to position, time, speed, direction of travel, altitude, vertical drop, jump airtime, jump distance, etc. Processor 42 may store the outputs and/or any other data in memory 46. Processor 42 may also transfer the outputs and/or any other date to another device through input/output interface 48. Processor 42 also produces a video signal 61 defining an image to be displayed and provides video signal 61 to display unit 60. The content of video signal 61 may be controlled, as least in part, by user gestures as described below, and may also be controlled by the user interfacing with user interface keys 16, or by another electronic device interacting with processor 42 through input/output interface 48.

Power unit 50 comprises a battery 52 and a power conditioning circuit 54. Power conditioning circuit 54 receives electrical power from battery 52 and outputs electrical power at voltages and/or currents suitable for the various components of sensor unit 30, processor unit 40, and display unit 60.

Display unit 60 comprises a display driver 62 connected to receive video signal 61 from processor 42. Display driver 62 is configured to generate driving signals based on video signal 61, and to provide the driving signals to a display 64. Display 64 may comprise, for example, a QVGA having a 320×240 resolution and 16 bit colors. In some embodiments, display 64 may comprise, a micro LCD illuminated by a suitable backlight. In other embodiments, other types of displays may be used, such as, for example, LED or OLED displays, electroluminescent (EL) displays, or the like. Display 64 is configured to project the image defined by video signal 61 from processor 42. Display unit 60 may also comprise a display lens assembly 66 positioned to received the image projected by display 64. Display lens assembly 66 may be configured to enlarge the projected image and/or to focus the projected image for convenient viewing by a user.

Display unit 60 may be housed within a removable casing (not shown). Such a removable casing may be detachably received within a complementary-shaped recess in frame 12, 12C or 12D (in the case of goggles 10, mask 10C or sunglasses 10D), or between exterior shell 12B and the interior deformable layer (in the case of helmet 10B). The casing for display unit 60 may comprise a box-type or "clam shell"-type construction having a lower half and an upper half which may be opened (e.g. for access) or closed (e.g. to form a watertight enclosure). A separate moisture sealing gasket may mounted between the two halves before they are closed (e.g. snapped and/or screwed together) to form a moisture tight enclosure. The casing may define a series of compartments each designed to individually secure a display module, display back light, display lens and electrical connections. The casing may be held in place within a complementary recess by the walls of the recess itself, along with hooks and/or snaps or the like which may be molded into, or otherwise provided, on mating surfaces of the casing and/or the recess. The casing may additionally be held in place by screws coupleable to the exterior casing walls.

As one skilled in the art will appreciate based on the foregoing description, head-mounted information systems according to certain embodiments of the invention may be provided in a variety of different head-mounted devices (e.g. eyewear, helmets, masks, mobile communication devices and the like). In the following description, exemplary embodiments of the control of head-mounted information systems are described in the context of head-mounted display system 10' of goggles 10 shown in the illustrated example embodiment of FIG. 1 without loss of generality. It will be understood that the description provided herein is applicable in a similar manner (with suitable modification) to the control of head-mounted information systems provided in helmets (e.g. helmet 10B), masks (e.g., mask 10C), glasses (e.g., sunglasses 10D) or in other head-mounted devices.

In some embodiments, electronic system 20 of headmounted information system 10' of goggles 10 may be turned on and off using a user-interface key on the frame of the goggles or by tapping one of the outriggers of the frame. Once the electronic system is powered on, the default view appears in the display showing information relating to the user's activity. The user can switch between views by pressing or otherwise interacting with user interface keys on the frame or by tapping one of the outriggers of the frame. The user can customize his or her own view(s) by connecting the headmounted information system to a personal computer or other external device. Each view may be tailored to a particular activity to provide suitable information with a minimum requirement for user interaction during the activity. For example, during jumps in a fun-park, the user may select a jump view to display information such as jump airtime and distance. Similarly, if the activity is downhill skiing then a downhill view may be selected to show speed, distance, and optionally altitude. Information which is independent of the activity such as temperature, time, and text/call info may always be shown, but the display of such additional information is up to the user to decide and configure. Furthermore, the electronic system of the head-mounted information system may be configured to accept Bluetooth and other communication protocols, which allow for mobile text messages and call info to be received and displayed to the user at any time, depending on user preference. Staying connected while performing activities has many benefits. By way of non-limiting example, staying connected can be desirable on the ski mountain, where coordination of activities such as lift access, refreshments, and meeting places is part of the daily rhythm. Another benefit provided by some embodiments is safety—with the push of a user interface key, GPS coordinates may be sent to ski patrol or other emergency responders for fast rescue in an emergency. Also, the USB integration enables users to upload data from their head-mounted information system to a personal computer or other external device to track performance and to compare results with others (e.g. other riders and skiers within an online community). By way of example only, the online community could feature waypoint download for those desired off-path sights as well as air-time (jumps) rankings and prizes.

Figure 3:
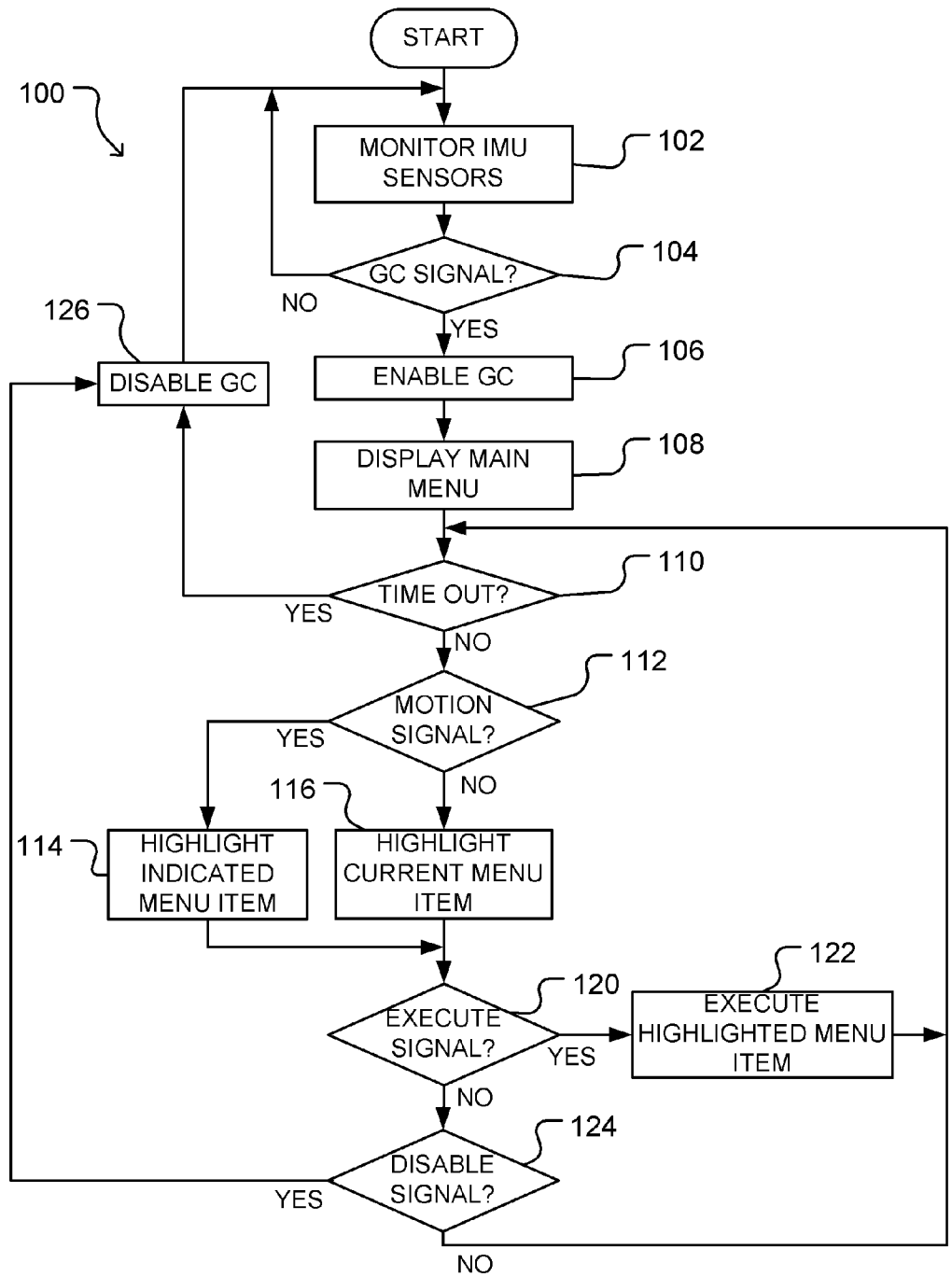
FIG. 3 is a flowchart showing an example method of controlling a head-mounted information system according to one embodiment of the invention.

FIG. 3 shows an example method 100 for controlling a head-mounted information system according to one embodiment Method 100 may, for example, be carried out by a head-mounted information system incorporated into devices such as those described above, or by another type of head-mounted information system which includes a processor, one or more motion sensors such as, for example, IMU sensors as discussed above, and a suitable display.

At block 102, the processor monitors the outputs of the IMU sensors (e.g., the accelerometer and gyroscope) in the goggles' frame. The processor may monitor the output of the IMU sensors continuously, or periodically throughout the operation of method 100. At block 104, the processor determines if a gesture control (GC) enable signal has been received. In some embodiments, a user may enable gesture control by moving the frame of the goggles (e.g., by moving the frame relative to his or her head, such as by tapping the frame with a hand or the like, or by moving his or her head, such as by turning, nodding, tilting or the like, etc.), in which case the processor monitors the IMU sensors' output to selectively generate a GC enable signal. In other embodiments, a user may enable gesture control by pressing a user interface key, flicking a switch on the frame of the goggles or otherwise interacting with a suitable user-interface component, in which case the processor monitors signals from such a key, switch or user-interface component to generate a GC enable signal.

In some embodiments wherein gesture control is initiated by goggle movement, a "gesture control enable movement profile" (GCE movement profile, for short) may be stored in memory accessible by the processor, and the processor may be configured to compare the output of the IMU sensors to the GCE movement profile to detect the occurrence of a gesture control enabling movement. For example, a GCE movement profile corresponding to a tap of the goggles (a particular example of frame movement profile, namely a tap profile) may, for example, be characterized by an acceleration in one direction having a short duration caused by the user's tap, followed by a corresponding acceleration in the opposite direction caused by the frame rebounding from the tap. For another example, a GCE movement profile corresponding to a head turn (a particular example head movement profile, namely a head turn profile) may, for example, be characterized by an angular velocity or acceleration exceeding a predetermined, user-configurable or calibratable threshold in a first angular direction about an axis parallel to the user's superior-inferior axis in the case of a head turn.

A gesture control signal may be generated in response to other frame movements, such as, for example, pulling goggles 10 away from the user's face (e.g., along an axis parallel to the user's anteroposterior axis) and returning goggles 10 back to the user's face, shifting goggles 10 up and down (e.g., along an axis parallel to the user's superior-inferior axis), and the like. In some embodiments, memory accessible to the processor comprises gesture control enable movement profiles corresponding to these or other frame movements (frame movement profiles). In some embodiments, a gesture control signal may be generated in response to other head movements, such as, for example, head nods (head rotation about an axis parallel to the mediolateral axis), head tilts (head rotation about an axis parallel to the anteroposterior axis), and the like. A memory accessible to the processor may comprise gesture control enable movement profiles corresponding to these or other head movements (head movement profiles). The direction of particular anatomical axes (e.g., mediolateral, superior-inferior, anteroposterior, etc.) may be inferred from the normal positioning of goggles 10 (or other headwear, such as helmet 10B, mask 10C, sunglasses 10D, or the like) when in use (e.g., it may be inferred that the lateral horizontal axis of goggles 10 is normally approximately parallel to the mediolateral axis of the user when worn, that the superior-inferior axis is normally approximately vertical when goggles 10 are worn, and that the anteroposterior axis is normally approximately perpendicular to the bridge of goggles 10 and the vertical axis when goggles 10 are worn).

In some embodiments, the processor may be configured to generate a GC enable signal when the occurrence of a pattern (e.g., of two or more) of goggle movements (e.g., frame movements or head movements) is detected within a predetermined, user-configurable and/or calibratable time period, and when the amplitude of the IMU sensors' output for the detected movements is within predefined, user-configurable and/or calibratable limits. The processor may be configured to detect the occurrence of a pattern of goggle movements by detecting a output of the IMU sensors that fits two or more GCE movement profiles in sequence. For example, the processor may be configured to detect two occurrences of a tap profile within a predefined, user-configurable and/or calibratable time period. The processor may be configured to detect the occurrence of a pattern of goggle movements by detecting a the output of the IMU sensors that fits a GCE movement profile corresponding to two or more distinct goggle movements occurring within a predefined, user-configurable and/or calibratable time period. (e.g., a GCE movement profile corresponding to a sequence of two taps).

In some embodiments, the processor may be configured to determine a direction of a detected movement from the IMU sensors' outputs. In some such embodiments, the processor may be configured to generate a GC enable signal only when two or more movements are detected in the same direction or suitably similar directions. For example, the processor may be configured to generate a GC enable signal when two taps are detected within a predetermined, user-configurable or calibratable time period having amplitudes within predefined, user-configurable or calibratable limits, and directional information from the IMU sensors for the two taps is substantially the same or within some predetermined, user-configurable or calibratable directional proximity thresholds. In other embodiments, the processor may be configured to generate a GC enable signal only when the movements taps have particular, predetermined, user-configurable or calibratable directions. For example, the processor may be configured to generate a GC enable signal when two rightward taps are detected within a predetermined, user-configurable or calibratable time period having amplitudes within predefined, user-configurable or calibratable limits. In other embodiments, other directional combinations of movements may be required to generate a GC enable signal.

In some embodiments, the head-mounted information system may be calibrated for a particular user. For example, a user may enable a calibration mode using user interface keys, other user-interface components or other controls on the goggles, or by interacting with the head-mounted information system using an external device such as a mobile phone, PDA, computer, or the like. In the calibration mode, the processor may cause the display to prompt the user to move the goggles according to the user's preferred manner of enabling GC (e.g., moving the goggles' frame in a particular manner, performing a particular sequence of head movements, etc.), record the outputs from the IMU sensors, and store the outputs as an example calibration GCE movement profile. The processor may then use the stored calibration GCE movement profile as a basis to ascertain one or more movements and/or to detect one or more movements to generate a GC enable signal, as discussed above. Similar calibration routines may also be performed for other control signals, such as the motion control signals and execute control signals discussed below. An example calibration method is described further below with respect to FIG. 11.

Some embodiments of the invention are adapted for use during activities which may subject the user to relatively high-frequency vibration (e.g., motorcycle riding, piloting all-terrain vehicles, downhill skiing, snowboarding or mountain biking, windsurfing, etc.). Where a user is subjected to high-frequency vibration, motion may incidentally be imparted to goggles 10. In some embodiments, the output of the IMU sensors may be low pass filtered to remove signals above a certain frequency. In some embodiments, the output of the IMU sensors may be filtered to remove components above about 10 Hz, or some other desired frequency. Low pass filtering output of the IMU sensors may remove or suppress output corresponding to movement of goggle 10 that is not user-initiated (e.g., vibration). By low pass filtering output of the IMU sensors the processor may avoid generating a GC enable signal based on non-user-initiated movement of goggles 10. In some embodiments, the output of the IMU sensors may be continuously low-pass filtered. Low pass filtering output of the IMU sensors may be performed by the processor, by signal conditioning circuitry interposed between the IMU sensors and the processor, by some other suitable configuration of hardware and/or software. For example, the processor may be configured to apply a low pass filter to received signals from IMU sensors. In some embodiments, signal conditioning circuitry interposed between the IMU sensors and the processor is integrated with the IMU sensors.

If no GC enable signal is generated (block 104 NO output), method 100 cycles back and repeats blocks 102 and 104 until conditions for generating a GC enable signal are detected. Once a GC enable signal is generated (block 104 YES output), method 100 proceeds to block 106 where the processor enables a gesture control mode. At block 108, the processor causes the display to display a main menu. When in gesture control mode (e.g. after gesture control mode is enabled in block 106), the processor is configured to transform movement signals represented by outputs from the IMU sensors into various control signals indicating commands for controlling the operation of the processor and the display, such as, for example, highlighting menu items, switching between different menus, and executing actions, as discussed below.

In some embodiments, method 100 may be configured to exit gesture control mode if a timeout occurs. In such embodiments, at block 110, the processor determines if a timeout has occurred. A timeout may occur, for example, when a predetermined, user-configurable or calibratable amount of time has passed since the GC enable signal was generated, or since an execute control signal was generated, as discussed below. If a timeout has occurred (block 110 YES output), method 100 proceeds to block 126 where the processor disables gesture control mode and returns the head-mounted information system to a normal operation mode. After block 126, method 100 returns to cycle through blocks 102 and 104 to await another GC enable signal.

If no timeout has occurred (block 110 NO output), method 100 proceeds to block 112 where the processor determines if a motion control signal is to be generated based on the outputs of the IMU sensors. In some embodiments, the output of the IMU sensors may be low pass filtered to remove signals above a certain frequency. In some embodiments, the output of the IMU sensors may be filtered to remove components above about 10 Hz. Low pass filtering output of the IMU sensors may remove or suppress output corresponding to movement of goggle 10 that is not user-initiated (e.g., vibration). If such vibration induced motion is registered as a motion control signal (e.g., for controlling a menu on display 60), display 60 may become a distraction and/or a menu displayed thereon may be difficult to navigate. By low pass filtering output of the IMU sensors the processor may avoid generating a motion control signal based on non-user-initiated movement of goggles 10. In some embodiments, the output of the IMU sensors may be continuously low-pass filtered. Low pass filtering output of the IMU sensors may be performed by the processor, by signal conditioning circuitry interposed between the IMU sensors and the processor, by some other suitable configuration of hardware and/or software. For example, the processor may be configured to apply a low pass filter to received signals from IMU sensors. In some embodiments, signal conditioning circuitry interposed between the IMU sensors and the processor is integrated with the IMU sensors.

Example methods of generating motion control signals are discussed below with reference to FIGS. 4-10. Motion control signals may be produced by frame movements and/or head movements. In some embodiments, producing each of a GC enable signal and a motion control signal comprises detecting a different one of a frame movement and a head movement. For example, in some embodiments, a GC enable signal is generated by a frame movement and a motion control signal is generated by a head movement.

In some embodiments, the processor is configured to determine whether or not to generate a motion control signal by detecting the occurrence of a motion control movement profile (analogous to a GCE movement profile) in the outputs of the IMU sensors. An example of such an embodiment is described below with reference to FIG. 10. A motion control movement profile may typically correspond to a goggle movement (or pattern of goggle movements) that is different from a GCE movement profile, but in some embodiments could correspond to the same goggle movement (or pattern of goggle movements) as a GCE movement profile.

Motion control signals may correspond intuitively to the direction of associated frame movements and/or head movements. For example, in some embodiments, leftward and rightward motion control signals may be produced by the user turning his or her head to the left and right, respectively. In some embodiments, leftward and rightward motion control signals may be produced by the user tapping the left and right sides of the frame, respectively.

Returning to FIG. 3, after block 112 method 100 proceeds to one of blocks 114 or 116. If a motion control signal is received (block 112 YES output), method 100 proceeds to block 114, where the processor interprets the motion control signal as a menu navigation command and accordingly highlights a menu item indicated by the motion control signal, for example by moving a cursor or the like. For example, as discussed further below, if a leftward motion control signal is received, the processor may move the cursor left from a current position to highlight the menu item to the left of the current menu item. Similarly, if a rightward, upward, downward, or diagonal motion control signal is received, the processor may move the cursor right, up, down, or diagonally, respectively. If no motion control signal is received (block 112 NO output), method 100 proceeds to block 116, where the processor highlights a current menu item. The current menu item may initially be set to a default item of the main menu in some embodiments.

After a menu item is highlighted at block 114 or 116, method 100 proceeds to block 120, where the processor determines if an execute control signal is to be generated. In some embodiments, the processor is configured to selectively generate an execute control signal by detecting the occurrence of an execute movement profile (analogous to a GCE movement profile or a motion control movement profile) in the outputs of the IMU sensors. An execute movement profile may correspond to the same goggle movement (or pattern of goggle movements) as a GCE movement profile, or to a goggle movement (or pattern of goggle movements) that is different from a GCE movement profile.

If an execute control signal is received (block 120 YES output), method 100 proceeds to block 122, where the processor executes the highlighted menu item. Receiving an execute control signal may also cause the processor to reset a timeout timer in some embodiments. Executing the highlighted menu item may comprise, for example, displaying performance or other information on the display, displaying a submenu on the display, interfacing with an external device such as, for example, a mobile phone, or other actions.

In some embodiments, execution of certain menu items may cause method 100 to terminate. For example, one or more menu items may be provided to turn off the electronic components of the head-mounted information system, or switch the head-mounted information system into a power saving mode wherein the display, IMU sensors and/or other components are disabled. Similarly, in some embodiments a menu item may be provided to disable the gesture control mode, in which case if an execute control signal is received when such a menu item is highlighted, method 100 proceeds to block 126 where the processor disables gesture control mode, as discussed above.

If no execute control signal is received (block 120 NO output), method 100 proceeds to block 124, where the processor determines if a GC disable signal is to be generated. In some embodiments, an GC disable signal may be generated in response to the presence of an GC disable (GCD) movement profile (analogous to a GCE movement profile) in the outputs of the IMU sensors. In some embodiments, a user may disable gesture control mode by performing the same action employed to enable gesture control mode. For example, a GC disable signal may be generated when a GCD movement profile corresponding to two taps of the goggles within a predetermined, user-configurable or calibratable time period occurs in the IMU sensors' output, as discussed above, or when the user presses a user interface key, flicks a switch or otherwise interacts with a user-interface component. In some embodiments the processor may be configured to continuously or periodically check for the occurrence of a GC disable signal throughout the operation of method 100 and disable the gesture control mode whenever a GC disable signal is detected.

If no GC disable signal is received (block 124 NO output), method 100 returns to block 110 where the processor determines if a timeout has occurred, as discussed above, and continues to cycle though blocks 110, 112, 114/116, 120 and 122/124, until a GC disable signal is received, a timeout occurs, or a menu item which terminates method 100 is executed, so that a user can navigate through various menus and submenus stored in memory accessible by the processor to highlight and execute one or more desired menu items. If a GC disable signal is received (block 124 YES output), method 100 proceeds to block 126 where the processor disables gesture control mode, as discussed above.

Figure 3A:
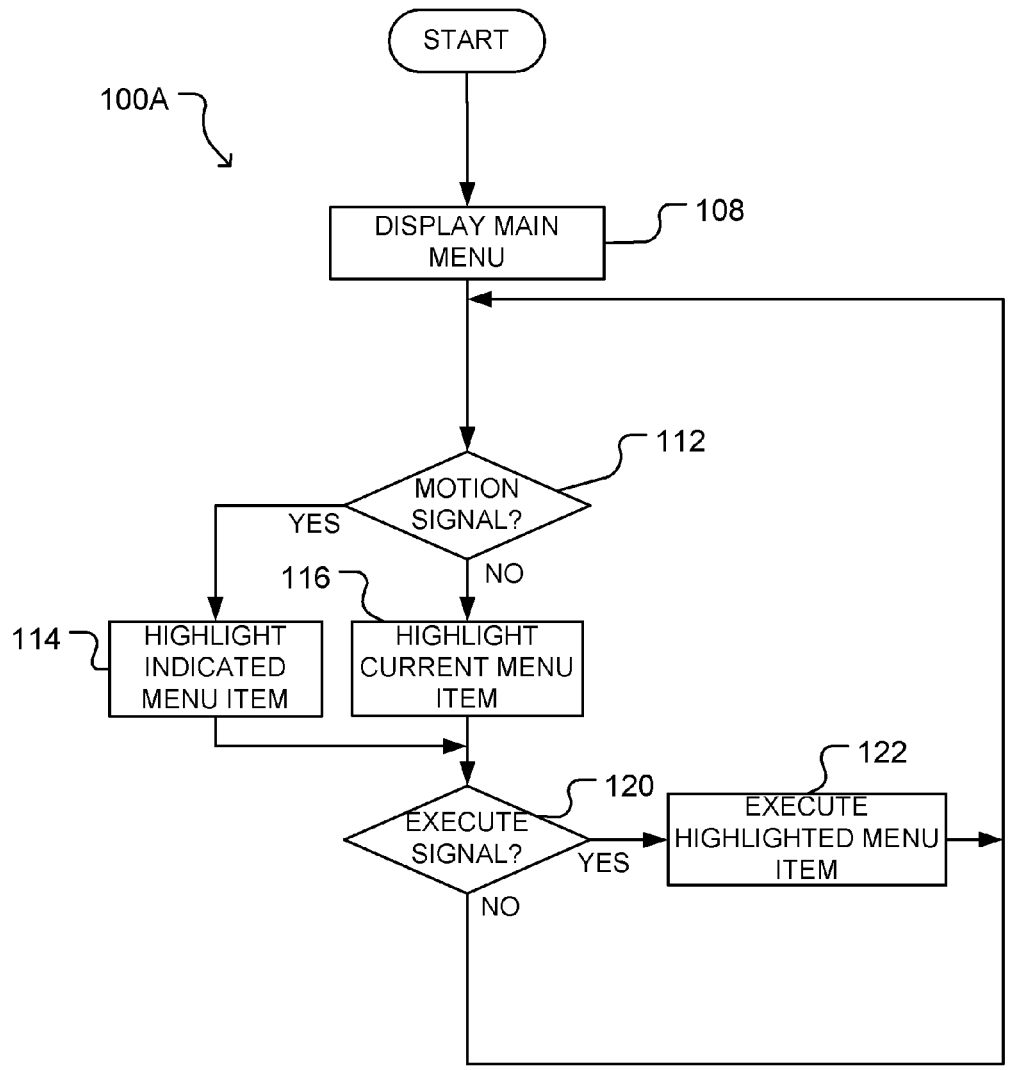
FIG. 3A is a flowchart showing another example method of controlling a head-mounted information system.

FIG. 3A shows an example method 100A for controlling a head-mounted information system according to one embodiment. Method 100A comprises several of the same blocks as method 100, and these blocks are identified with the same reference numerals used in FIG. 3. Method 100A may, for example, be carried out by head-mounted information system 10' incorporated into goggles 10 such as those described above, or by another type of head-mounted information system which includes a processor, one or more motion sensors such as, for example, IMU sensors as discussed above, and a suitable display. Method 100A differs from method 100 in that method 100A is always subject to gesture control. Motion control signals detected based on the outputs of the IMU sensors control menu navigation and action execution at all times during method 100.

Motion control signals detected in method 100A may correspond to movement profiles characterized by a particular movement occurring while goggles 10 are in a particular orientation. In some embodiments, motion control signals detected in method 100A correspond to movement profiles characteristic of movements that are both not typical of a user's activity and that may be performed by a user without the user having to change the focus of his or her vision. For example, motion control signals detected in method 100A may correspond to rightward and leftward head tilts that occur while the user's head is tilted forward (chin-tucked), or while the user's head is in some other predetermined orientation.

Figures 4, 5:
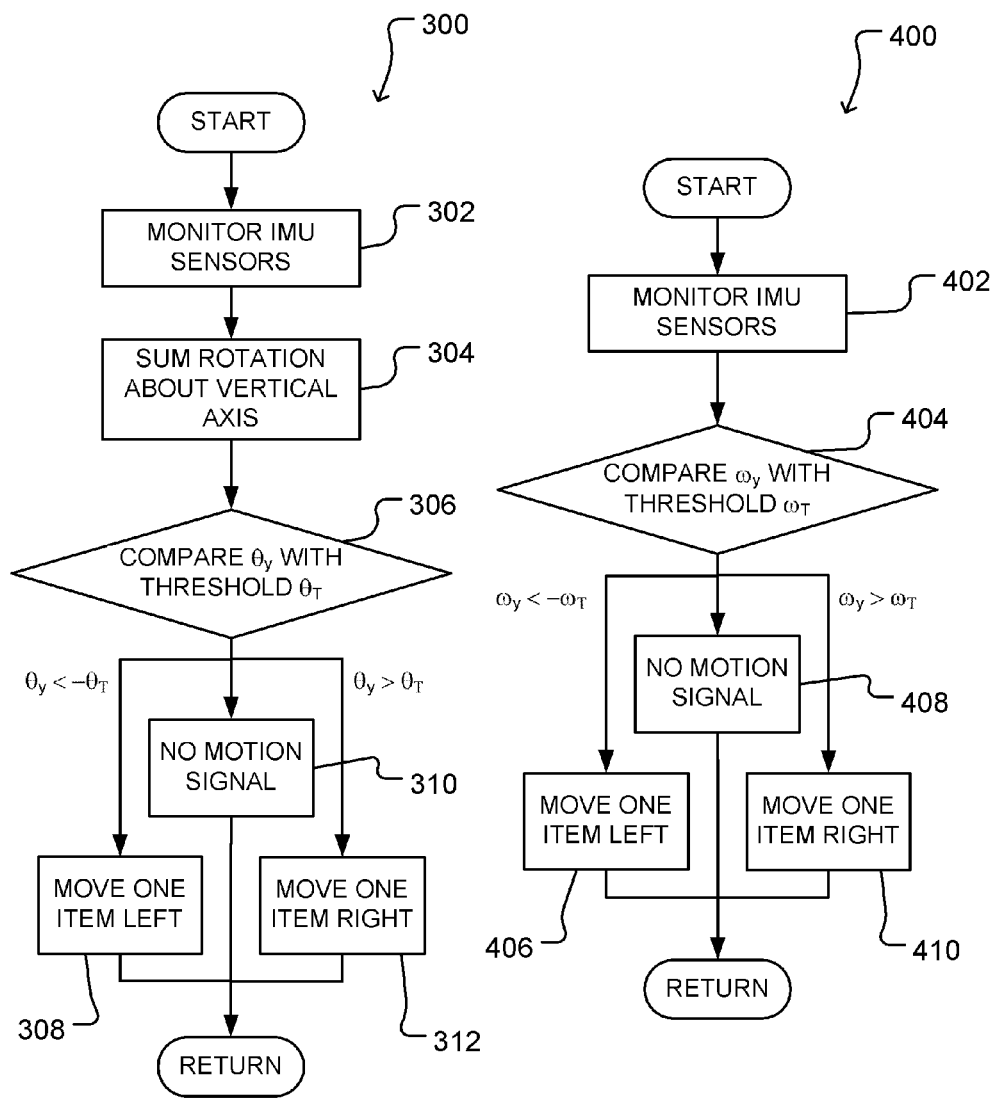
FIGS. 4 to 10 are flowcharts showing example methods of converting IMU sensor outputs to menu navigation commands according to embodiments of the invention.

FIG. 4 shows an example method 300 of converting IMU sensor outputs to motion control signals for moving a cursor according to one embodiment. Method 300 may, for example, be called as part of block 112 in method 100 or 100A of FIG. 3 or 3A. At block 302 the processor monitors the outputs of the IMU sensors. At block 304 the processor sums any rotation signals received about a vertical axis, in order to determine a head angle $\theta_y$, representing the angular displacement of a user's head from an initial direction (e.g. with positive angles representing a rightward rotation, and negative angles representing a leftward rotation). At block 306 the processor compares head angle $\theta_y$ with a threshold angle $\theta_T$. Threshold angle $\theta_T$ may be predetermined, user-configurable or calibrated and may be, for example, 30 degrees in some embodiments. If $\theta_y$ is less than $-\theta_T$, method 300 proceeds to block 308, where the processor produces a motion control signal for moving a cursor (which may be indicated by highlighting) one menu item to the left. If $\theta_y$ is greater than $\theta_T$, method 300 proceeds to block 312, where the processor produces a motion control signal for moving a cursor (which may be indicated by highlighting) one menu item to the right. If the absolute value of $\theta_y$ is less than $\theta_T$, method 300 proceeds to block 310, and the processor does not produce a motion control signal. After block 308, 310 or 312, method 300 ends and returns to the point at which it was called, for example, to block 112 of method 100.

FIG. 5 shows an example method 400 of converting IMU sensor outputs to menu navigation commands according to another embodiment. Method 400 may, for example, be called as part of block 112 in method 100 or 100A of FIG. 3 or 3A. At block 402 the processor monitors the outputs of the IMU sensors in order to determine a head angular velocity $\omega_y$, representing the angular velocity of a user's head (e.g. with positive velocities representing a rightward rotation, and negative velocities representing a leftward rotation). In some embodiments, the output of the IMU sensors may be low pass filtered to remove higher frequency components, as described above.

At block 404 the processor compares head angular velocity $\omega_y$ with a threshold angular velocity $\omega_T$. Threshold angular velocity $\omega_T$ may be predetermine, user-configurable or calibratable and may be, for example, 0.5 radians per second in some embodiments. If $\omega_y$ is less than $-\omega_T$, method 400 proceeds to block 406, where the processor produces a motion control signal for moving a cursor (which may be indicated by highlighting) one menu item to the left. If $\omega_y$ is greater than $\omega_T$, method 400 proceeds to block 410, where the processor produces a motion control signal for moving a cursor (which may be indicated by highlighting) one menu item to the right. If the absolute value of $\omega_y$ is less than $\omega_T$, method 400 proceeds to block 408, and the processor does not produce a motion control signal. After block 406, 408 or 410, method 400 ends and returns to the point at which it was called, for example, to block 112 of method 100.

In some embodiments, blocks 406 and 410 may comprise waiting for a reset condition to be met after producing a motion control signal before converting IMU sensor outputs into additional motion control signals. In some embodiments, waiting for a reset condition to be met may comprise waiting for a refractory period in which the processor does not convert IMU sensors output into menu navigation commands. For example, a processor may be configured to, in the gesture control mode, after producing a motion control signal for menu navigation, not convert signals received from the IMU sensors into menu navigation commands for a pre-determined refractory period. In some embodiments, the refractory period may begin when a motion control signal is generated. In some embodiments, the refractory period may begin when the output from the IMO sensors indicate a change in direction of head movement. For instance, where a user rotates his or her head from an initial orientation with angular velocity greater than $\omega_T$, waiting a refractory period after the processor produces a motion control signal for moving the cursor one menu item to the right may permit the user to counter-rotate his or her head back to the initial orientation with velocity greater than $-\omega_T$, without the counter-rotation being registered as a motion control signal for moving the cursor one menu item to the left. In some embodiments, the refractory period may be a predetermined time period (e.g., 0.5 or 0.25 seconds). In some embodiment, the refractory period may be user-configurable, such that a user may adjust the duration of the refractory period to suit his or her personal preference.

In some embodiments, waiting for a reset condition to be met may comprise waiting until the user's head has substantially returned to an initial orientation. For example, a processor may be configured to, in the gesture control mode, after producing a motion control signal for menu navigation, not convert signals received from the IMU sensors into menu navigation commands until the output of the IMU sensors indicates that head angle is within a pre-determined displacement of an initial angle. For instance, blocks 406 and 410 may comprise, after a user has rotated his or her head from an initial orientation with angular velocity greater than $\omega_T$, waiting until the user's head angle $\theta_y$ is within a threshold angular displacement (e.g., about 5 degrees) of the user's initial head angle (e.g., 0 degrees).

Figure 6:
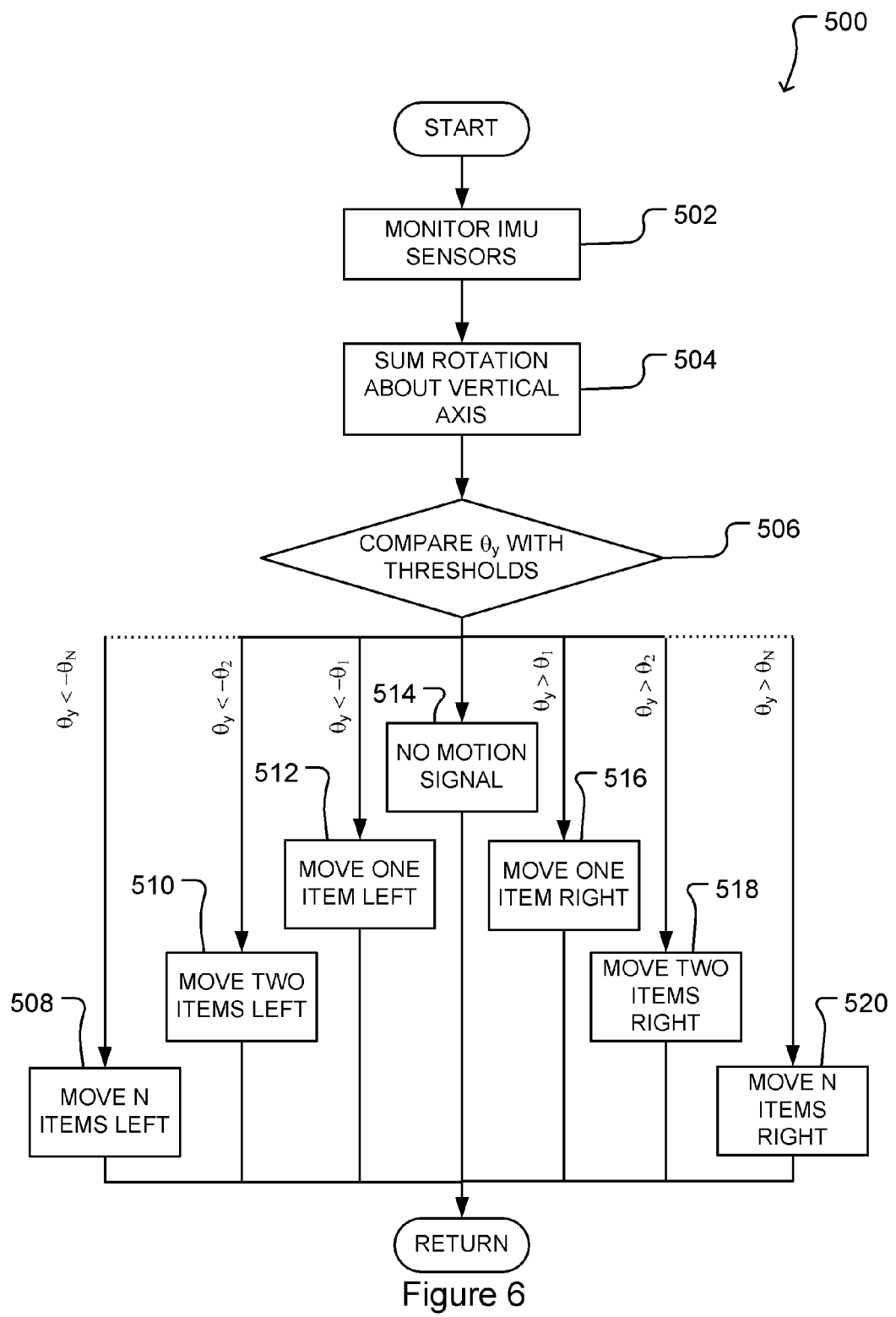

FIG. 6 shows an example method 500 of converting IMU sensor outputs to menu navigation commands according to another embodiment. Method 500 is similar to method 300 of FIG. 4, with blocks 502, 504 and 506 corresponding to blocks 302, 304 and 306, except that at block 506 the processor compares head angle $\theta_y$ with a plurality of predetermined, user-configurable or calibratable threshold angles $\theta_1$ to $\theta_N$. In some embodiments only two threshold angles may be provided, but any practical number N of threshold angles may be provided. The number N of threshold angles may also be predetermined, user configurable or calibratable. After block 506, method 500 proceeds to one of blocks 508-520 as determined by the comparison at block 506. For example, if $\theta_y$ is greater than a second threshold $\theta_2$ but less than a third threshold $\theta_3$, method 500 proceeds to block 518 where the processor produces a motion control signal for moving a cursor (which may be indicated by highlighting) two menu items to the right.

In some embodiments, method 500 is adapted for use with a menu configuration in which a cursor is initially located at the center of a plurality of N menu items corresponding to N threshold angles, and movement to each of N threshold angles moves the cursor to the corresponding menu item. In some such embodiments, the N menu items may be arranged along a line perpendicular to the axis of the N threshold angles, so that a user may 'scan' the cursor through each menu item along the line by moving his or her head through the N threshold angles. For example, the N menu items may be arranged along a horizontal line, and the user may scan the cursor through each menu item along the line by turning his or her head from side to side through the range of threshold angles.

Figure 7:
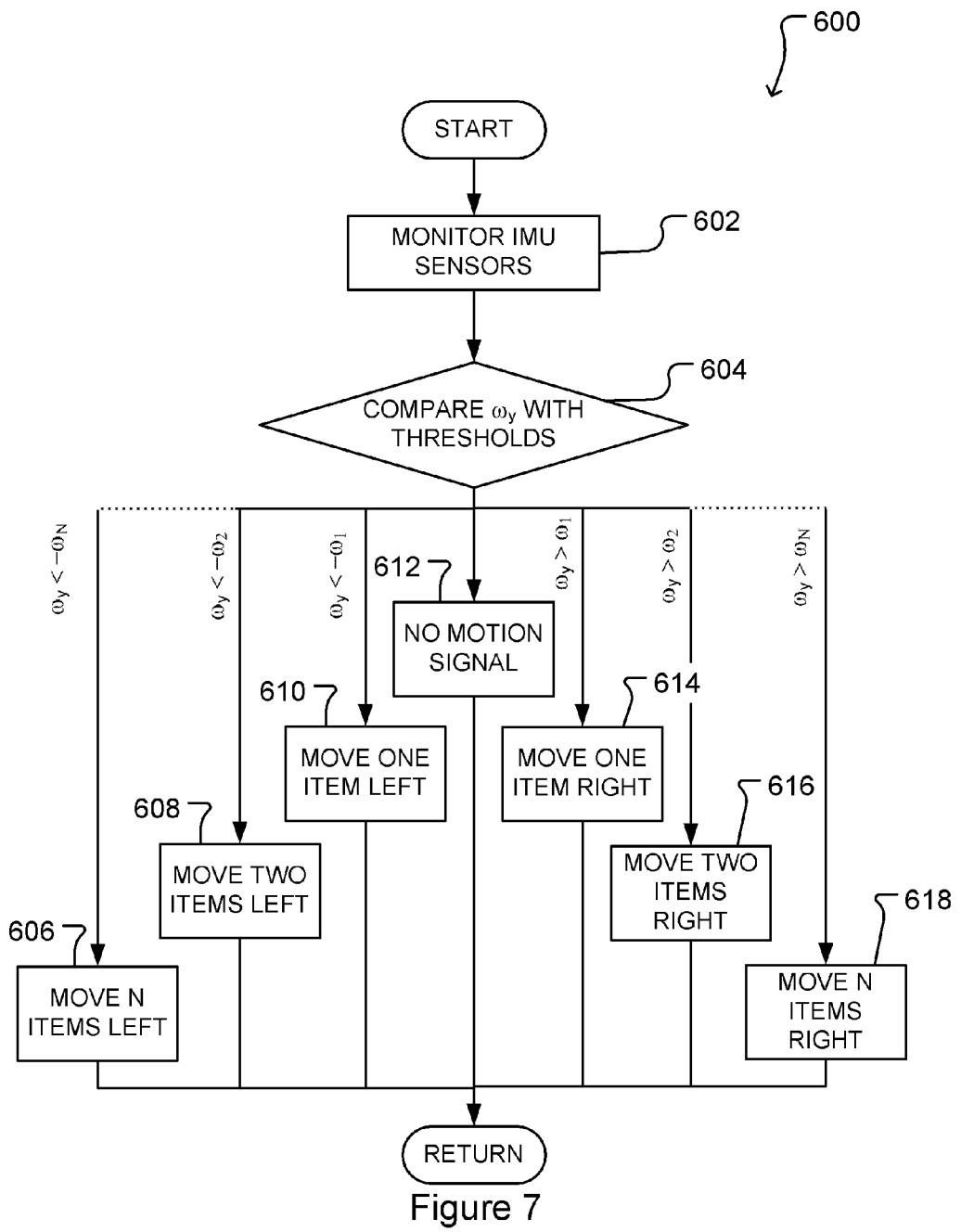

FIG. 7 shows an example method 600 of converting IMU sensor outputs to menu navigation commands according to another embodiment. Method 600 is similar to method 400 of FIG. 5, with blocks 602 and 604 corresponding to blocks 402 and 404, except that at block 604 the processor compares head angular velocity $\omega_y$ with a plurality of predetermined, user-configurable or calibratable threshold angular velocities $\omega_1$ to $\omega_N$. In some embodiments only two threshold angular velocities may be provided, but any practical number N of threshold angular velocities may be provided. The number N of threshold angular velocities may also be predetermined, user configurable or calibratable. After block 604, method 600 proceeds to one of blocks 606-618 to convert the IMU sensor outputs to motion control signals as determined by the comparison at block 604. For example, if $\omega_y$ is greater than a second threshold $\omega_2$ but less than a third threshold $\omega_3$, method 600 proceeds to block 616 where the processor produces a motion control signal for moving a cursor (which may be indicated by highlighting) two menu items to the right. Method 600 may also comprise waiting for a reset condition to be met (as described above with respect to method 400) after generating a motion control signal at one of blocks 606-618.

In the example methods of FIGS. 4-7 discussed above, leftward and rightward goggle movements are converted into menu navigation commands left and right, respectively. Similar methods may be implemented to convert upward and downward movements into up and down menu navigation commands, respectively, and/or to convert a combination of left/right and up/down movements into menu navigation commands for moving a cursor diagonally.

Figure 8:
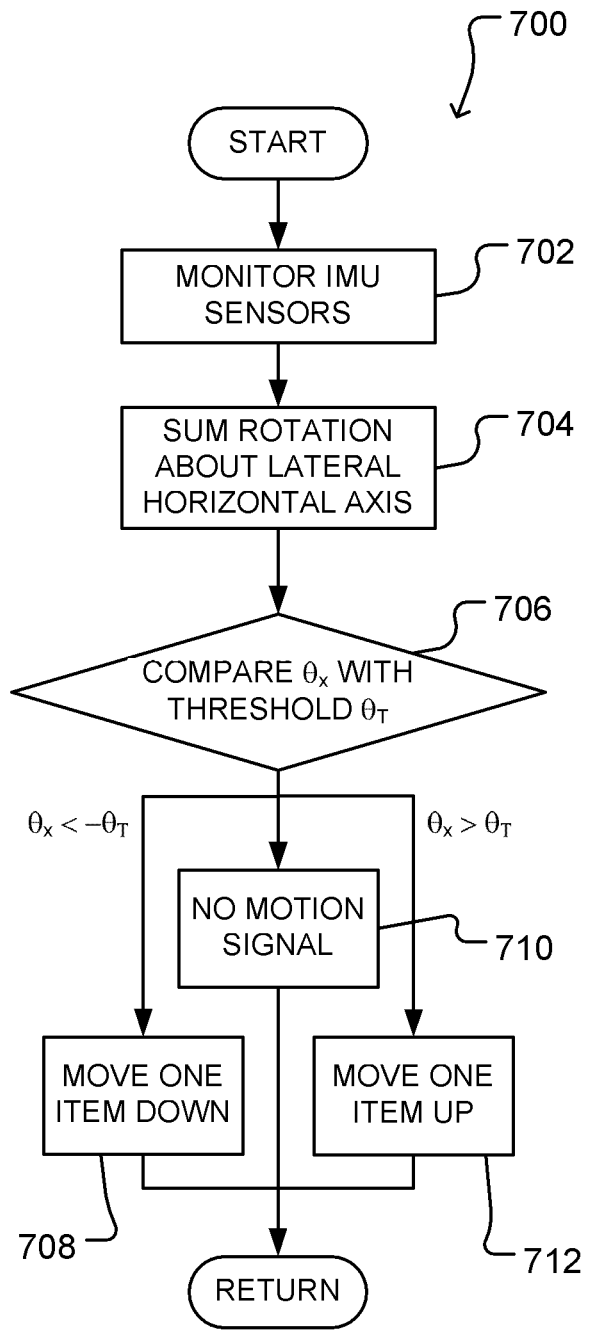

FIG. 8 shows an example method 700 of converting IMU sensor outputs to menu navigation commands according to one embodiment. Method 700 may, for example, be called as part of block 112 method 100 or 100A of FIG. 3 or 3A. At block 702 the processor monitors the outputs of the IMU sensors. At block 704 the processor sums any rotation signals received about a lateral horizontal axis, in order to determine a head angle $\theta_x$, representing the angular displacement of a user's head from an initial direction (e.g. with positive angles representing an upward rotation, and negative angles representing a downward rotation). At block 706 the processor compares head angle $\theta_x$ with a threshold angle $\theta_T$. Threshold angle $\theta_T$ may be predetermined, user-configurable or calibratable and may be, for example, 30 degrees in some embodiments. If $\theta_x$ is less than $-\theta_T$, method 300 proceeds to block 708, where the processor produces a motion control signal for moving a cursor (which may be indicated by highlighting) one menu item down. If $\theta_x$ is greater than $\theta_T$, method 300 proceeds to block 712, where the processor produces a motion control signal for moving a cursor (which may be indicated by highlighting) one menu item up. If the absolute value of $\theta_y$ is less than $\theta_T$, method 700 proceeds to block 710, and the processor does not produce a motion control signal. After block 708, 710 or 712, method 700 ends and returns to the point at which it was called, for example, to block 112 of method 100.

As one skilled in the art will appreciate, method 700 is similar to method 300 of FIG. 4, but method 700 converts upward and downward movements into corresponding motion control signals, instead of leftward and rightward movements as in the case of method 300. Similarly, methods 400, 500 and 600 of FIGS. 5-7 may also be adapted to convert upward and downward movements into corresponding motion control signals. In embodiments where upward and downward movements are converted into corresponding motion control signals, an execute control signal at block 120 of method 100 of FIG. 3 may be indicated by an execute movement profile corresponding to one or more taps of the user's goggles rather than nod(s) of the user's head. Also, in some embodiments, leftward, rightward, upward and downward movements may all be monitored and converted into corresponding motion control signals, so that a user may move a cursor diagonally, if desired.

Figure 9:
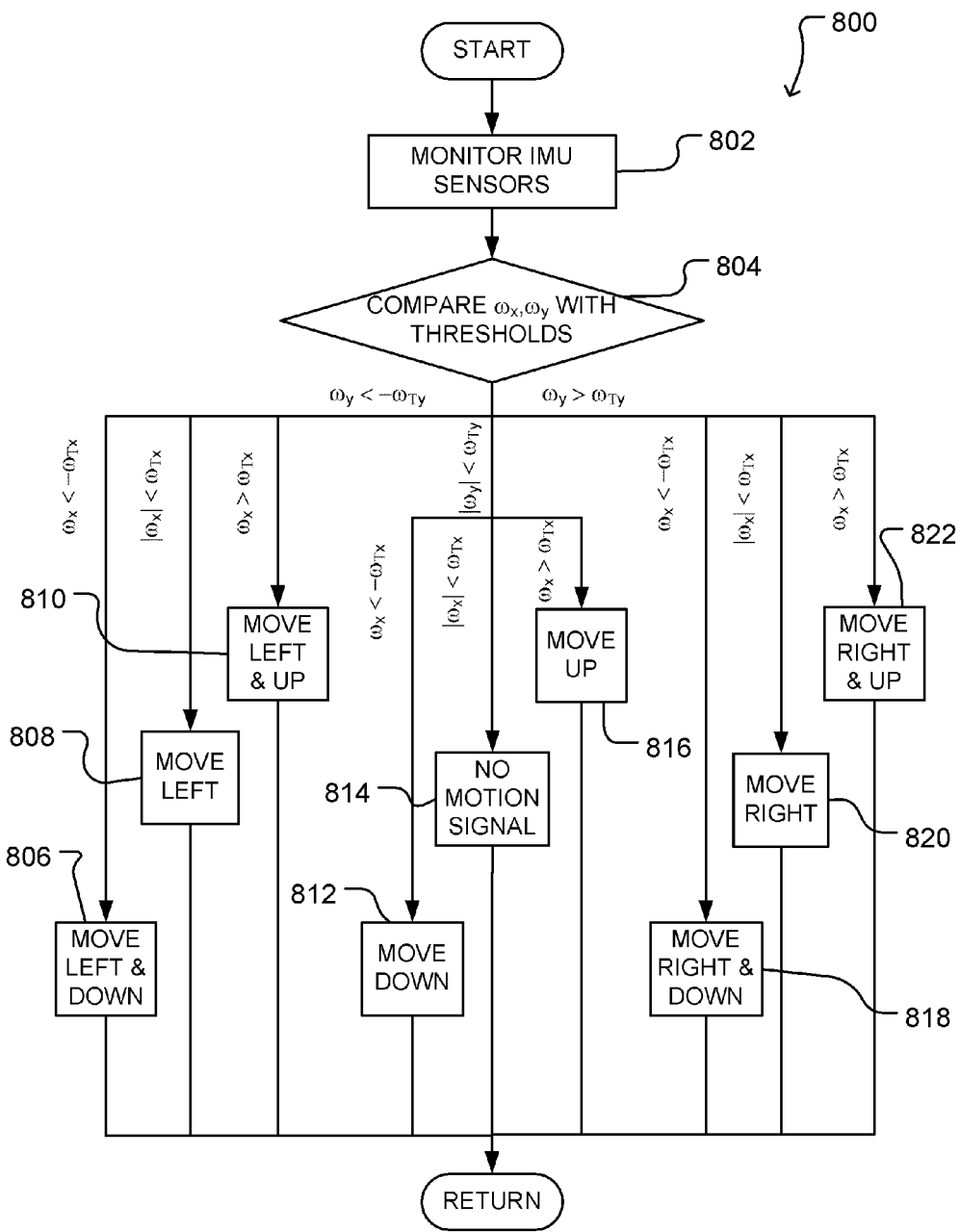

FIG. 9 shows an example method 800 of converting IMU sensor outputs to menu navigation commands according to one embodiment. Method 800 may, for example, be called as part of block 112 in method 100 or 100A of FIG. 3 or 3A. At block 802 the processor monitors the outputs of the IMU sensors in order to determine head angular velocities $\omega_x$ and $\omega_y$, representing the angular velocities of a user's head about a lateral horizontal axis and a vertical axis, respectively. For example, positive velocities of $\omega_x$ could represent an upward rotation, negative velocities of $\omega_x$ could represent a downward rotation, positive velocities of $\omega_y$ could represent a rightward rotation, and negative velocities of $\omega_y$ could represent a leftward rotation. At block 804 the processor compares head angular velocities $\omega_x$ and $\omega_y$ with threshold angular velocities $\omega_{Tx}$ and $\omega_{Ty}$. Threshold angular velocities $\omega_{Tx}$ and $\omega_{Ty}$ may be different in some embodiments, or they may be the same.

Threshold angular velocities $\omega_{Tx}$ and $\omega_{Ty}$ may be predetermined, user-configurable or calibratable and may be, for example, 0.5 radians per second in some embodiments. After block 804, method 800 proceeds to one of blocks 806, 808, 810, 812, 814, 816, 818, 820 or 822, where the processor produces a motion control signal (or no motion control signal in the case of block 814) based on the results of the comparison. For example, if $\omega_x$ is less than $-\omega_{Tx}$ and $\omega_y$ is greater than $\omega_{Ty}$, method 800 proceeds to block 818, where the processor produces a motion control signal for moving a cursor diagonally down and to the right. Method 800 may also comprise waiting for a reset condition to be met (as described above with respect to method 400) after generating a motion control signal at one of blocks 806-822.

Figure 10:
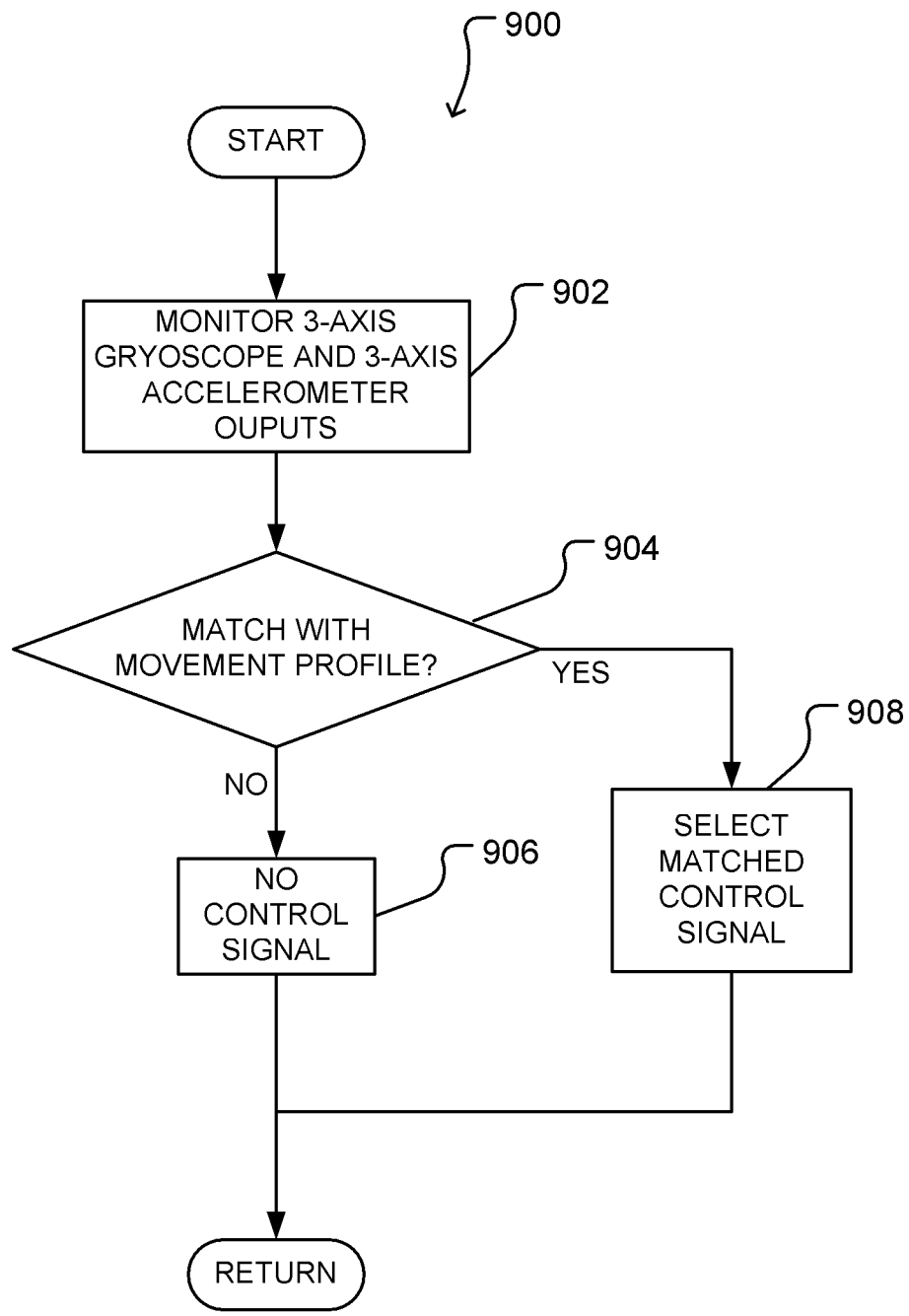

FIG. 10 shows an example method 900 of converting IMU sensor outputs to menu navigation commands according to one embodiment. Method 900 may, for example, be called as part of blocks 104, 112, 120 and/or 124 in method 100 or block 112 in method 100A as described above with reference to FIGS. 3 and 3A. At block 902 the processor monitors signals received from a 3-axis gyroscope and a 3-axis accelerometer representative of angular velocities about three axes and linear accelerations along three axes. At block 904 the processor compares the received signals to a plurality of control signal movement profiles stored in memory. The stored control signal movement profiles may comprise, for example, one or more of a gesture control enable movement profile, a plurality of motion control movement profiles (e.g., for moving a cursor or highlighted item left, right, up, down, diagonally, etc.), an execute movement profile, and a gesture control disable movement profile. In some embodiments, comparing the received signals with stored movement profiles at block 904 may also comprise low pass filtering the received signals to remove higher frequency components, as described above.

If the received signals do not match a stored movement profile (block 904 NO output), method 900 proceeds to block 906, and the processor does not generate a control signal. If the received signals do match a stored movement profile (block 904 YES output), method 900 proceeds to block 908, and the processor generates the control signal corresponding to the matched movement profile. Block 908 may also comprise waiting for a return condition to be met (as described above with respect to method 400) after generating a control signal. After block 906 or 908, method 900 ends and returns to the point at which it was called, for example, to one of blocks 104, 112, 120 or 124.

Figure 11:
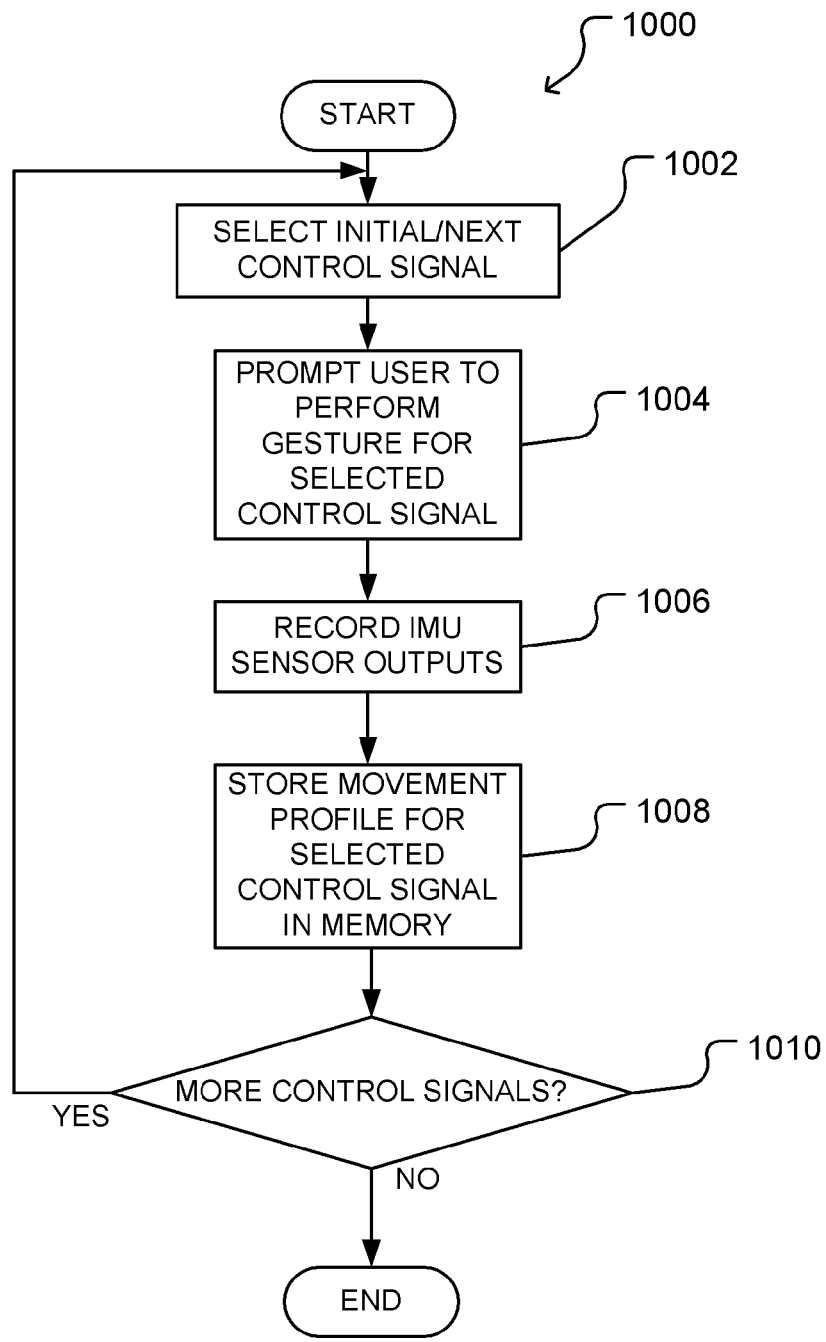
FIG. 11 is a flowchart showing an example method of calibrating a head-mounted information system according to one embodiment of the invention.

FIG. 11 shows an example method 1000 of calibrating a head-mounted information system according to one embodiment. Method 1000 may, for example, be carried out in a head mounted information system comprising IMU sensors such as a 3-axis gyroscope and a 3-axis accelerometer. Method 1000 may be initiated, for example, by highlighting and executing a calibration menu item selected by any of the methods described above, using user interface keys, other user-interface components or other controls on the goggles, or by interacting with the head-mounted information system using an external device such as a mobile phone, PDA, computer, or the like. At block 1002, the processor selects an initial control signal to be calibrated. At block 1004 the user is prompted to perform his or her desired gesture for the selected control signal. The user may be prompted, for example, by displaying instructions on a display unit of the head-mounted information system, or on a display of an external device. At block 1006 the processor records the outputs of the IMU sensors during the user's desired gesture. At block 1008 the processor stores a movement profile for the selected control signal in memory based on the recorded sensor outputs. At block 1010 the processor determines if further control signals are to be calibrated. If so, (block 1010 YES output) method 1000 returns to block 1002 and the next control signal is selected for calibration. If there are no further control signals to be calibrated (block 1010 NO output), method 1000 ends.

Embodiments of present invention can be adapted for use in a variety of environments. By way of non-limiting example, embodiments of the present invention may be used in sporting activities, such as snowboarding, skiing, snowmobiling, cycling (including motorcycling, moto-cross and mountain biking), kite surfing, sky diving, cross country running, SCUBA diving, snorkeling or the like. Such sporting activities may be enhanced by head-mounted information systems according to embodiments of the present invention. Suitable sporting activities may include any activities in which participants typically use goggles, helmets, masks, sunglasses or other head-mounted devices during the activities, but embodiments of the invention can be used in other activities (i.e. activities wherein participants do not typically used head-mounted devices). In other embodiments, head-mounted information systems similar to those described herein can be used in military, police, or rescue settings. Certain embodiments of present invention provide lightweight affordable solutions that are non-obtrusive for front and peripheral vision enabling features such as navigation, buddy tracking, silent communication direct to eye, emergency GPS coordinate dispatch to HQ, and various performance measurements using built-in sensors and/or wireless connectivity to external devices and services. In yet another embodiment of the present invention, traditional endurance sports such as triathlon, running, speed skating, cycling, and rowing can also benefit from devices according to other embodiments of the present invention. These endurance sports and would benefit greatly from easy accessible performance read-outs during the activity. In still more embodiments of the present invention other activities can be enhanced. In a gaming embodiment head-mounted information systems can record a wearer's activities and upload this to online software applications which may share with a community. For example, head-mounted information systems could record a user's moves on the mountain and facilitate uploading of 3d approximations of such moves to an online community. Head-mounted information systems may also be capable of downloading information (e.g. a professional snowboarder's moves). Such downloaded information may be used to practice while receiving instructions direct to eye during the activity. Certain embodiments of the present invention can be used for instructional purposes, where physical activity is involved making normal paper or pocket based aids inconvenient.

In some embodiments, the processor may be configured to convert certain head movements, or combinations of head movements to specific commands, to allow for "shortcut" movements for executing certain commands. For example, the processor may be configured to convert a double nod to one side into a "select" command during menu navigation, or a "fast forward" command during a video playback in some embodiments. As another example, a circular motion with the head might be converted to another particular command. Such shortcut movements for executing specific commands may be preprogrammed (e.g., as movement profiles) into the instructions running on the processor, and may user-configurable or calibratable in some embodiments.

Certain implementations of the invention comprise computer processors which execute software instructions which cause the processors to perform a method of the invention. For example, one or more processors in a head-mounted display apparatus may implement the methods of FIGS. 3 to 11 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As one skilled in the art will appreciate, the example embodiments discussed above are for illustrative purposes only, and methods and systems according to embodiments of the invention may be implemented in any suitable device having appropriately configured processing hardware. Such processing hardware may include one or more conventional processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like.

While a number of exemplary aspects and embodiments have been discussed above, those of skill in the art will recognize certain modifications, permutations, additions and sub-combinations thereof.

What is claimed is:

1. A head-mounted information system comprising:
   a frame configured to be mounted on a head of a user;
   a display unit coupled to the frame, the display unit comprising a display for producing an image;
   a sensor unit coupled to the frame, the sensor unit comprising one or more motion sensors; and,
   a processor unit coupled to the frame, the processor unit connected to receive signals from the one or more motion sensors and configured to process the one or more motion signals to produce outputs representing parameters relating to user performance of a physical activity, the processor unit comprising a processor and a memory accessible by the processor,
   wherein the processor unit is configured to:
      monitor the received signals and enter a gesture control mode upon occurrence of a gesture control enable signal, wherein in the gesture control mode the processor is configured to convert signals received from the motion sensors into menu navigation commands; and
   in the gesture control mode, monitor received rotation signals to detect angular velocity about an axis to determine a first head angular velocity and compare the first head angular velocity to one or more threshold angular velocities to produce first motion control signals for menu navigation along a first direction.

2. A system according to claim 1 wherein the memory has a gesture control enable movement profile stored therein and the processor is configured to generate the gesture control enable signal when the received signals contain an occurrence of the gesture control enable movement profile.

3. A system according to claim 2 wherein the memory has a frame movement profile stored therein and the gesture control enable movement profile comprises the frame movement profile.

4. A system according to claim 3 wherein the frame movement profile comprises a tap profile.

5. A system according to claim 4 wherein the processor is configured to generate the gesture control enable signal when the received signals contain two occurrences of the tap profile within a predetermined time period.

6. A system according to claim 4 wherein the processor is configured to generate the gesture control enable signal when an amplitude of an occurrence of the tap profile is within a predefined range.

7. A system according to claim 1 wherein the processor is configured to, in the gesture control mode, sum received rotation signals about a vertical axis to determine a first head angle and compare the first head angle to one or more threshold angles to produce first motion control signals for menu navigation along a first direction.

8. A system according to claim 7 wherein the one or more threshold angles comprise a plurality of threshold angles, and wherein the processor is configured to produce a motion control signal indicating a desired amount of movement based on a highest exceeded one of the plurality of threshold angles.

9. A system according to claim 7 wherein the processor is configured to sum received rotation signals about a lateral horizontal axis to determine a second head angle and compare the second head angle to one or more threshold angles to produce second motion control signals for menu navigation along a second direction.

10. A system according to claim 1 wherein the processor is configured to detect angular velocity about a vertical axis.

11. A system according to claim 10 wherein the processor is configured to sum received rotation signals about a lateral horizontal axis to determine a second head angular velocity and compare the second head angular velocity to one or more threshold angular velocities to produce second motion control signals for menu navigation along a second direction.

12. A system according to claim 1 wherein the one or more threshold angular velocities comprise a plurality of threshold angular velocities, and wherein the processor is configured to produce a motion control signal indicating a desired amount of movement based on a highest exceeded one of the plurality of threshold angular velocities.

13. A system according to claim 1 wherein the processor is configured to, in the gesture control mode, after producing a motion control signal for menu navigation, wait to convert further signals from the motion sensors into menu navigation commands until a reset condition is met.

14. A system according to claim 13 wherein waiting for the reset condition to be met comprises waiting for a pre-determined refractory period.

15. A system according to claim 14 wherein the processor is configured to start the refractory period upon producing the motion control signal.

16. A system according to claim 14 wherein the processor is configured to start the refractory period upon detecting a change in a direction of head movement.

17. A system according to claim 13 wherein waiting for the reset condition to be met comprises summing received rotation signals about a vertical axis to determine a head angle and waiting until the determined head angle is within a pre-determined displacement of an initial angle.

18. A system according to claim 1 wherein the processor is configured to detect angular velocity about a lateral horizontal axis.

19. A system according to claim 1 wherein the processor is configured to, in the gesture control mode, produce an execute control signal when the received signals contain a single occurrence of a tap profile.

20. A system according to claim 19 wherein the processor is configured to, in the gesture control mode, produce the execute control signal when the received signals contain the single occurrence of the tap profile within a predetermined, user-configurable or calibratable time period from a most recent motion control signal.

21. A method of controlling a head-mounted information system comprising a frame configured to be mounted on a head of a user, a display unit coupled to the frame, the display unit comprising a display for producing an image, a sensor unit coupled to the frame, the sensor unit comprising one or more motion sensors, and, a processor unit coupled to the frame, the processor unit connected to receive signals from the one or more motion sensors and configured to process the one or more motion signals to produce outputs representing parameters relating to user performance of a physical activity, the processor unit comprising a processor and a memory accessible by the processor, the method comprising:
  monitoring the signals from the motion sensors;
  entering a gesture control mode upon occurrence of a gesture control enable signal; and,
  in the gesture control mode:
    displaying a menu comprising a plurality of menu items on the display; and,
    converting signals received from the motion sensors into menu navigation commands by monitoring received signals to detect angular velocity about an axis to determine a first head angular velocity and comparing the first head angular velocity to one or more threshold angular velocities to produce first motion control signals for menu navigation along a first direction.

22. A method according to claim 21 wherein the memory has a gesture control enable movement profile stored therein, comprising generating the gesture control enable signal when the received signals contains an occurrence of the gesture control enable movement profile.

23. A method according to claim 22 wherein the memory has a frame movement profile stored therein and the gesture control enable movement profile comprises the frame movement profile.

24. A method according to claim 23 wherein the frame movement profile comprises a tap profile.

25. A method according to claim 24 comprising generating the gesture control enable signal when the received signals contain two occurrences of the tap profile within a predetermined time period.

26. A method according to claim 24 comprising generating the gesture control enable signal when an amplitude of an occurrence of the tap profile is within a predefined range.

27. A method according to claim 21 wherein the axis is a vertical axis.

28. A method according to claim 27 comprising, in the gesture control mode, monitoring received rotation signals about a lateral horizontal axis to determine a second head angular velocity and comparing the second head angular velocity to one or more threshold angular velocities to produce second motion control signals for menu navigation along a second direction.

29. A method according to claim 21 wherein the one or more threshold angular velocities comprise a plurality of threshold angular velocities, comprising producing a motion control signal indicating a desired amount of movement based on a highest exceeded one of the plurality of threshold angular velocities.

30. A method according to claim 21 comprising, in the gesture control mode, after producing a motion control signal for menu navigation, waiting to convert further signals from the motion sensors into menu navigation commands until a reset condition is met.

31. A method according to claim 30 wherein waiting for the reset condition to be met comprises waiting for a pre-determined refractory period.

32. A method according to claim 31 comprising starting the refractory period upon producing the motion control signal.

33. A method according to claim 31 comprising starting the refractory period upon detecting a change in a direction of head movement.

34. A method according to claim 30 wherein waiting for the reset condition to be met comprises summing received rotation signals about a vertical axis to determine a head angle and waiting until the determined head angle is within a pre-determined displacement of an initial angle.

35. A method according to claim 21 wherein the axis is a lateral horizontal axis.

36. A method according to claim 21 comprising, in the gesture control mode, producing an execute control signal when the received signals contain a single occurrence of a tap profile.

37. A method according to claim 36 comprising, in the gesture control mode, producing the execute control signal when the received signals contain the single occurrence of the tap profile within a predetermined, user-configurable or calibratable time period from a most recent motion control signal.

* * * * *